(12) United States Patent
Zhang et al.

(10) Patent No.: US 12,081,755 B2
(45) Date of Patent: Sep. 3, 2024

(54) CONTEXT CODING FOR TRANSFORM SKIP MODE

(71) Applicants: BEIJING BYTEDANCE NETWORK TECHNOLOGY CO., LTD., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

(*) Notice: Subject to any disclaimer, the term of this patent is extended or adjusted under 35 U.S.C. 154(b) by 0 days.

(21) Appl. No.: 17/868,384

(22) Filed: Jul. 19, 2022

(65) Prior Publication Data

US 2022/0377337 A1 Nov. 24, 2022

Related U.S. Application Data

(63) Continuation of application No. 17/522,347, filed on Nov. 9, 2021, now Pat. No. 11,425,380, which is a (Continued)

(30) Foreign Application Priority Data

May 14, 2019 (WO) ................ PCT/CN2019/086814

(51) Int. Cl.
*H04N 19/122* (2014.01)
*H04N 19/105* (2014.01)
(Continued)

(52) U.S. Cl.
CPC ......... *H04N 19/122* (2014.11); *H04N 19/105* (2014.11); *H04N 19/157* (2014.11);
(Continued)

(58) Field of Classification Search
CPC .... H04N 19/105; H04N 19/157; H04N 19/13; H04N 19/176; H04N 19/122;
(Continued)

(56) References Cited

U.S. PATENT DOCUMENTS

| 2012/0230418 A1 | 9/2012 | Sole Rojals et al. |
| 2013/0230097 A1 | 9/2013 | Sole Rojals et al. |

(Continued)

FOREIGN PATENT DOCUMENTS

| CN | 107211136 A | 9/2017 |
| WO | 2015100514 A1 | 7/2015 |

OTHER PUBLICATIONS

Foreign Communication From A Related Counterpart Application, International Application No. PCT/CN2020/090194, English Translation of International Search Report, Aug. 12, 2020, 11 pages.
(Continued)

*Primary Examiner* — Neil R Mikeska
(74) *Attorney, Agent, or Firm* — Conley Rose, P.C.

(57) ABSTRACT

A method of visual processing includes determining, during a conversion between a block of a video and a bitstream representation of the video, whether there is a switch from a first residual coding technique to a second residual coding technique based on a number of context coded bins per unit used in the first residual coding technique. The unit is included in the block, and coefficients of the unit are coded in the bitstream representation in multiple passes. The method also includes performing the conversion based on the determining.

19 Claims, 26 Drawing Sheets

Related U.S. Application Data continuation of application No. PCT/CN2020/090194, filed on May 14, 2020.

(51) Int. Cl.
*H04N 19/157* (2014.01)
*H04N 19/176* (2014.01)
*H04N 19/192* (2014.01)
*H04N 19/70* (2014.01)

(52) U.S. Cl.
CPC ......... *H04N 19/176* (2014.11); *H04N 19/192* (2014.11); *H04N 19/70* (2014.11)

(58) Field of Classification Search
CPC .... H04N 19/136; H04N 19/18; H04N 19/192; H04N 19/70
See application file for complete search history.

(56) References Cited

U.S. PATENT DOCUMENTS

| | | |
|---|---|---|
| 2015/0103918 A1 | 4/2015 | Wang et al. |
| 2016/0353113 A1 | 12/2016 | Zhang et al. |
| 2017/0171560 A1 | 6/2017 | Kim et al. |
| 2018/0070100 A1 | 3/2018 | Chen et al. |
| 2019/0110080 A1 | 4/2019 | Said et al. |
| 2020/0236362 A1 | 7/2020 | Lee et al. |
| 2020/0244968 A1 | 7/2020 | Jun et al. |
| 2020/0280735 A1 | 9/2020 | Lim et al. |
| 2020/0296417 A1 | 9/2020 | Ko et al. |

OTHER PUBLICATIONS

Office Action dated Jan. 20, 2022, 9 pages, U.S. Appl. No. 17/522,347, filed Nov. 9, 2021.

Document: JVET-N1001-v2, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 361 pages.

Bossen, F., VTM-4.0, Retrieved on the internet: https://vcgit.hhi.fraunhofer.de/jvet/VVCSoftware_VTM/tags/VTM-4.0, Sep. 29, 2022, 2 pages.

Document: JVET-N0217, Pfaff, J., et al., "CE3: Affine linear weighted intra prediction (CE3-4.1, CE3-4.2)," Joint Video Experts Team (JVET) of ITU-T SG 16 WP 3 and ISO/IEC JTC 1/SC 29/WG 11 14th Meeting: Geneva, CH, Mar. 19-27, 2019, 17 pages.

Document: JVET-M0102-v5, De-Luxan-Hernandez, S., et al., "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, 9 pages.

Document: JVET-N0193, Koo, M., et al., "CE6: Reduced Secondary Transform (RST) (CE6-3.1)," Joint Video Experts Team (JVET) of ITU-T SG 16 WP 3 and ISO/IEC JTC 1/SC 29/WG 11 14th Meeting: Geneva, CH, Mar. 19-27, 2019, 19 pages.

Document: JVET-K0099, Salehifar, M., et al., "CE 6.2.6: Reduced Secondary Transform (RST)," Joint Video Experts Team (JVET) of ITU-T SG 16 WP 3 and ISO/IEC JTC 1/SC 29/WG 11 11th Meeting: Ljubljana, SI, Jul. 10-18, 2018, 12 pages.

Document: JVET-N0413, Karczewicz, M., et al., "CE8-related: Quantized residual BDPCM," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.

Document: JVET-L0133, Koo, M., et al., "CE 6-2.1: Reduced Secondary Transform (RST)," Joint Video Experts Team (JVET) of ITU-T SG 16 WP 3 and ISO/IEC JTC 1/SC 29/WG 11 12th Meeting: Macao, CN, Oct. 3-12, 2018, 8 pages.

2200 → 2210 performing a conversion between a current video unit and a bitstream representation of the current video unit, wherein the conversion includes context modeling of the current video unit based on applying a constraint on a maximum number of context coded bins per coding group (CG) associated with the current video unit, wherein information of the context modeling is included in the bitstream representation of the current video unit.

2510 — performing a conversion between a block of a video and a bitstream representation of the video, wherein the block comprises one or more coding groups, and wherein the current block is coded in the bitstream representation based on a constraint on a maximum number of context coded bins for each coding group

FIG. 25

```
┌─────────────────────────────────────────────────────────────┐
│ 2600                                                        │
│                                                             │
│         2610 — performing a conversion between a current    │
│         block of a video and a bitstream representation     │
│         of the video, wherein the current block is coded    │
│         in the bitstream representation based on a          │
│         constraint on a maximum number of context coded     │
│         bins for each syntax element or each coding pass    │
│         associated with the current block                   │
└─────────────────────────────────────────────────────────────┘
```

FIG. 26

CONTEXT CODING FOR TRANSFORM SKIP MODE

CROSS REFERENCE TO RELATED APPLICATIONS

This application is a continuation of U.S. application Ser. No. 17/522,347, filed on Nov. 9, 2021, which is a continuation of International Patent Application No. PCT/CN2020/090194, filed on May 14, 2020, which claims the priority to and benefits of International Patent Application No. PCT/CN2019/086814, filed on May 14, 2019. All of the aforementioned patent applications are hereby incorporated by reference in their entireties.

TECHNICAL FIELD

This patent document relates to video coding techniques, devices and systems.

BACKGROUND

Currently, efforts are underway to improve the performance of current video codec technologies to provide better compression ratios or provide video coding and decoding schemes that allow for lower complexity or parallelized implementations. Industry experts have recently proposed several new video coding tools and tests are currently underway for determining their effectivity.

SUMMARY

Devices, systems and methods related to digital video coding, and specifically, to management of motion vectors are described. The described methods may be applied to existing video coding standards (e.g., High Efficiency Video Coding (HEVC) or Versatile Video Coding (VVC) and future video coding standards or video codecs.

In one representative aspect, the disclosed embodiment may be used to provide a method for video processing. This method includes determining, during a conversion between a block of a video comprising one or more units and a bitstream representation of the video, whether to switch from a first residual coding technique to a second residual coding technique based on a number of context coded bins per unit used in the first residual coding technique. Coefficients of the unit are coded in the bitstream representation in multiple passes using the first residual coding technique or the second residual coding technique. The method also includes performing the conversion based on the determining.

In another representative aspect, the disclosed embodiment may be used to provide a method for video processing. This method includes performing a conversion between a block of a video and a bitstream representation of the video. The block comprises one or more coding groups, and the current block is coded in the bitstream representation based on a constraint on a maximum number of context coded bins for each coding group.

In another representative aspect, the disclosed embodiment may be used to provide a method for video processing. This method includes performing a conversion between a current block of a video and a bitstream representation of the video. The current block is coded in the bitstream representation based on a constraint on a maximum number of context coded bins for each syntax element or each coding pass associated with the current block.

In one representative aspect, the disclosed embodiment may be used to provide a method for video processing. This method includes performing a conversion between a current video unit and a bitstream representation of the current video unit, wherein the conversion includes context modeling of the current video unit based on applying a constraint on a maximum number of context coded bins per coding group (CG) associated with the current video unit, wherein information of the context modeling is included in the bitstream representation of the current video unit.

In another representative aspect, the disclosed embodiment may be used to provide another method for video processing. This method includes performing a conversion between a current video unit and a bitstream representation of the current video unit, wherein the conversion includes context modeling of the current video unit based on applying a constraint on a maximum number of context coded bins per syntax element or per coding pass associated with the current video unit, wherein information of the context modeling is included in the bitstream representation of the current video unit.

In another representative aspect, the disclosed embodiment may be used to provide another method for video processing. This method includes performing a conversion between a current video unit and a bitstream representation of the current video unit, wherein the conversion includes one or more residual coding steps such that each residual coding step is associated with a number of context coded bins per coding unit; and switching, during the conversion, from a first residual coding step to a second residual coding step based, at least in part, on a first number of context coded bins per coding unit in the first step and a second number of context coded bins per coding unit in the second step.

Further, in a representative aspect, an apparatus in a video system comprising a processor and a non-transitory memory with instructions thereon is disclosed. The instructions upon execution by the processor, cause the processor to implement any one or more of the disclosed methods.

Also, a computer program product stored on a non-transitory computer readable media, the computer program product including program code for carrying out any one or more of the disclosed methods is disclosed.

The above and other aspects and features of the disclosed embodiments are described in greater detail in the drawings, the description and the claims.

BRIEF DESCRIPTION OF THE DRAWINGS

FIG. 22 shows a flowchart of an example method for video coding.

FIG. 25 shows a flowchart of another example method for video processing according to various embodiments of the disclosure.

FIG. 26 shows a flowchart of yet another example method for video processing according to various embodiments of the disclosure.

DETAILED DESCRIPTION

1. Video Coding in HEVC/H.265

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced moving pictures experts group (MPEG)-1 and MPEG-4 Visual, and the two organizations jointly produced the H.262/MPEG-2 Video and H.264/MPEG-4 Advanced Video Coding (AVC) and H.265/ high efficiency video coding (HEVC) standards. Since H.262, the video coding standards are based on the hybrid video coding structure wherein temporal prediction plus transform coding are utilized. To explore the future video coding technologies beyond HEVC, Joint Video Exploration Team (JVET) was founded by video coding experts group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1. Coding Flow of a Typical Video Codec

Figure 1:
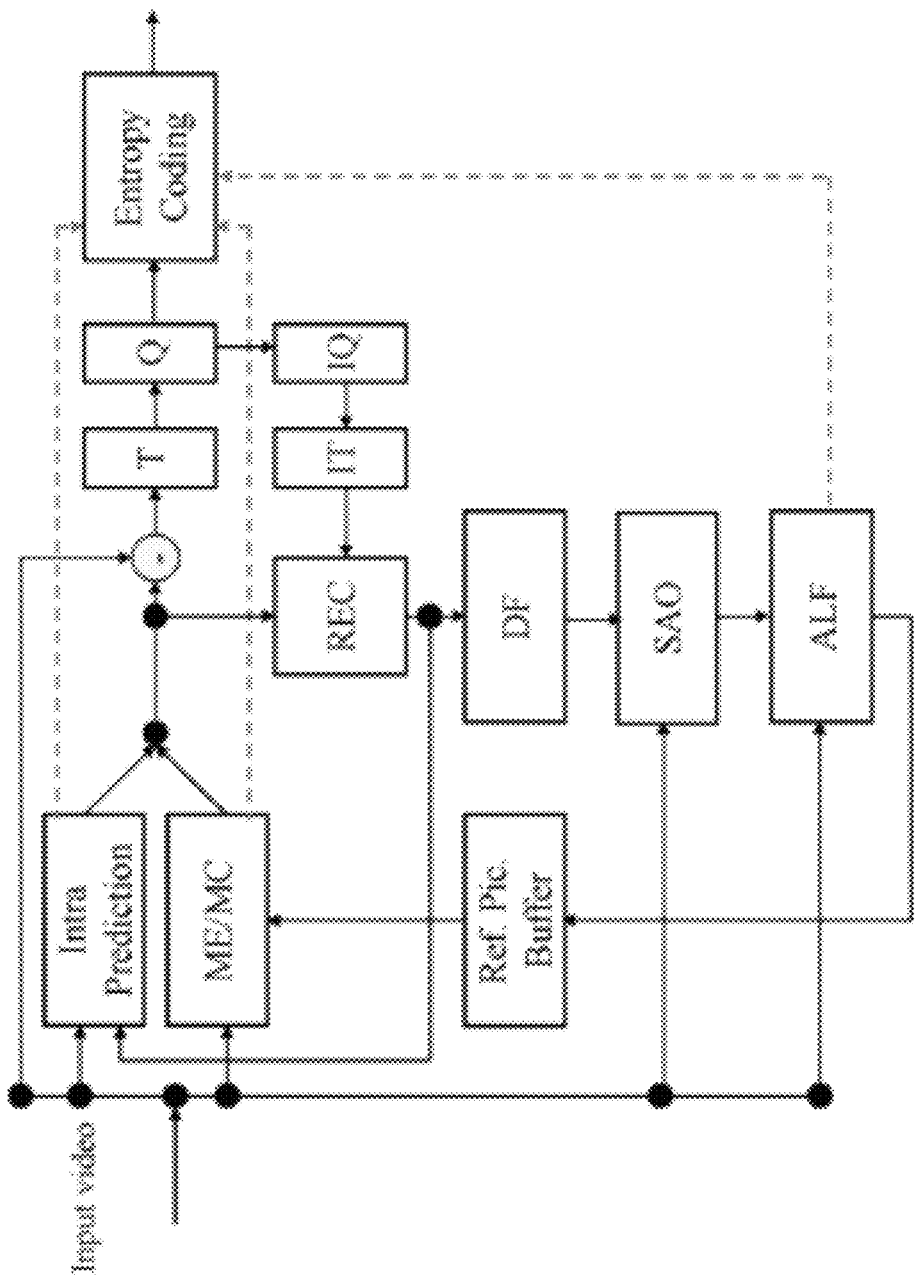
FIG. 1 shows an example of encoder block diagram.

FIG. 1 shows an example of encoder block diagram of VVC, which contains three in-loop filtering blocks: deblocking filter (DF), sample adaptive offset (SAO) and adaptive loop filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.2. Intra Coding in VVC 2.2.1. Intra Mode Coding with 67 Intra Prediction Modes To capture the arbitrary edge directions presented in natural video, the number of directional intra modes is extended from 33, as used in HEVC, to 65. The additional directional modes are depicted as red dotted arrows in FIG. 2, and the planar and DC modes remain the same. These denser directional intra prediction modes apply for all block sizes and for both luma and chroma intra predictions.

Figure 2:
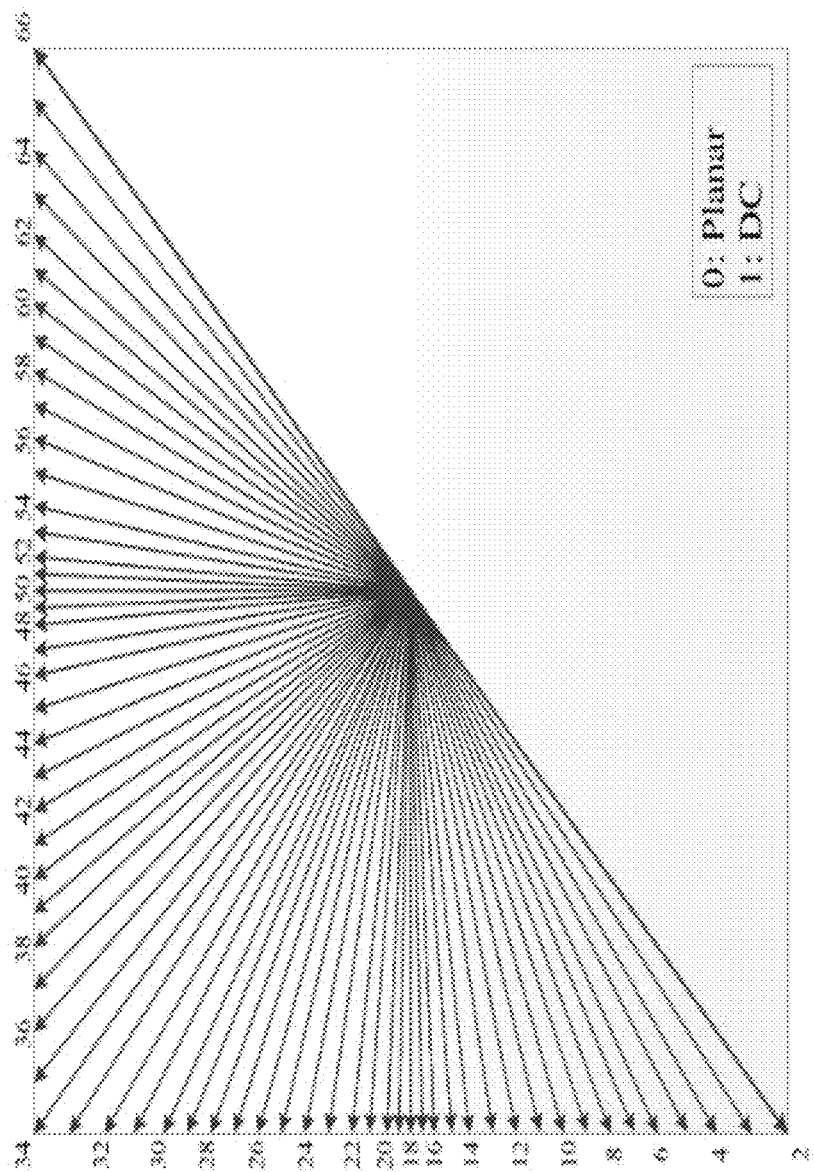
FIG. 2 shows an example of intra directional modes.

Conventional angular intra prediction directions are defined from 45 degrees to −135 degrees in clockwise direction as shown in FIG. 2. In VVC Test Model (VTM)2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, e.g., 67, and the intra mode coding is unchanged.

In the HEVC, every intra-coded block has a square shape and the length of each of its side is a power of 2. Thus, no division operations are required to generate an intra-predictor using DC mode. In VVV2, blocks can have a rectangular shape that may necessitate the use of a division operation per block in the general case. To avoid division operations for DC prediction, only the longer side is used to compute the average for non-square blocks.

In addition to the 67 intra prediction modes, wide-angle intra prediction for non-square blocks (WAIP) and position dependent intra prediction combination (PDPC) methods are further enabled for certain blocks. PDPC is applied to the following intra modes without signaling: planar, DC, horizontal, vertical, bottom-left angular mode and its eight adjacent angular modes, and top-right angular mode and its eight adjacent angular modes.

2.2.2. Affine Linear Weighted Intra Prediction (ALWIP, a.k.a. Matrix Based Intra Prediction)

2.2.2.1. Generation of the Reduced Prediction Signal by Matrix Vector Multiplication The neighboring reference samples are firstly downsampled via averaging to generate the reduced reference signal $bdry_{red}$. Then, the reduced prediction signal $pred_{red}$ is computed by calculating a matrix vector product and adding an offset:

$$pred_{red} = A \cdot bdry_{red} + b.$$

Here, A is a matrix that has $W_{red} \cdot H_{red}$ rows and 4 columns if W=H=4 and 8 columns in all other cases. b is a vector of size $W_{red} \cdot H_{red}$.

2.2.2.2. Illustration of the Entire ALWIP Process

The entire process of averaging, matrix vector multiplication and linear interpolation is illustrated for different shapes in FIGS. 3-6. Note, that the remaining shapes are treated as in one of the depicted cases.

Figure 3:
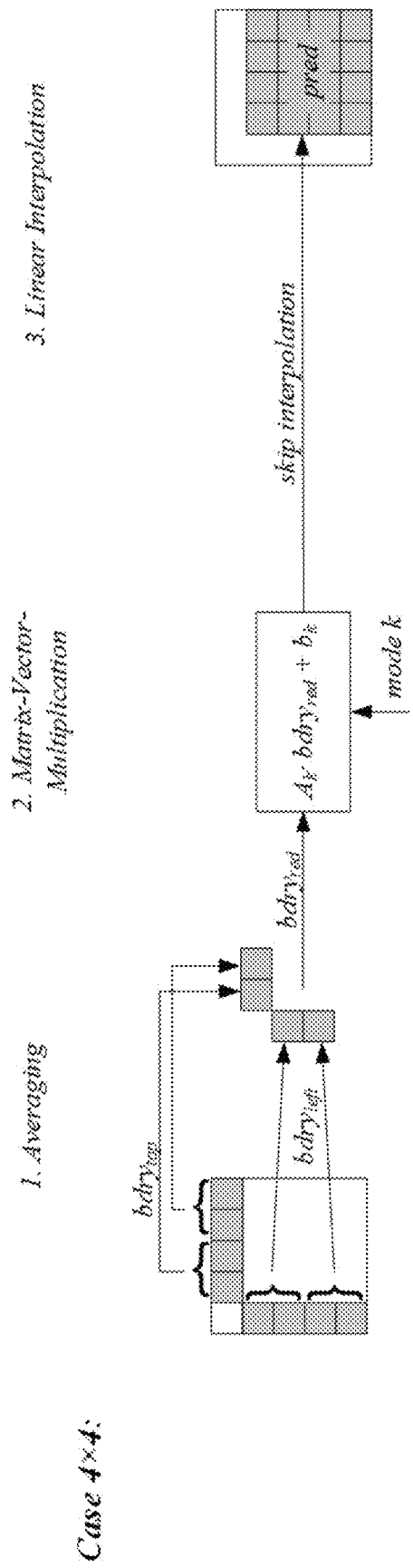
FIG. 3 shows an example of affine linear weighted intra prediction (ALWIP) for 4×4 blocks.

1. Given a 4×4 block, as shown in FIG. 3, ALWIP takes two averages along each axis of the boundary. The resulting four input samples enter the matrix vector multiplication. The matrices are taken from the set $S_0$. After adding an offset, this yields the 16 final prediction samples. Linear interpolation may not be necessary for generating the prediction signal. Thus, a total of (4·16)/(4·4)=4 multiplications per sample are performed.

Figure 4:
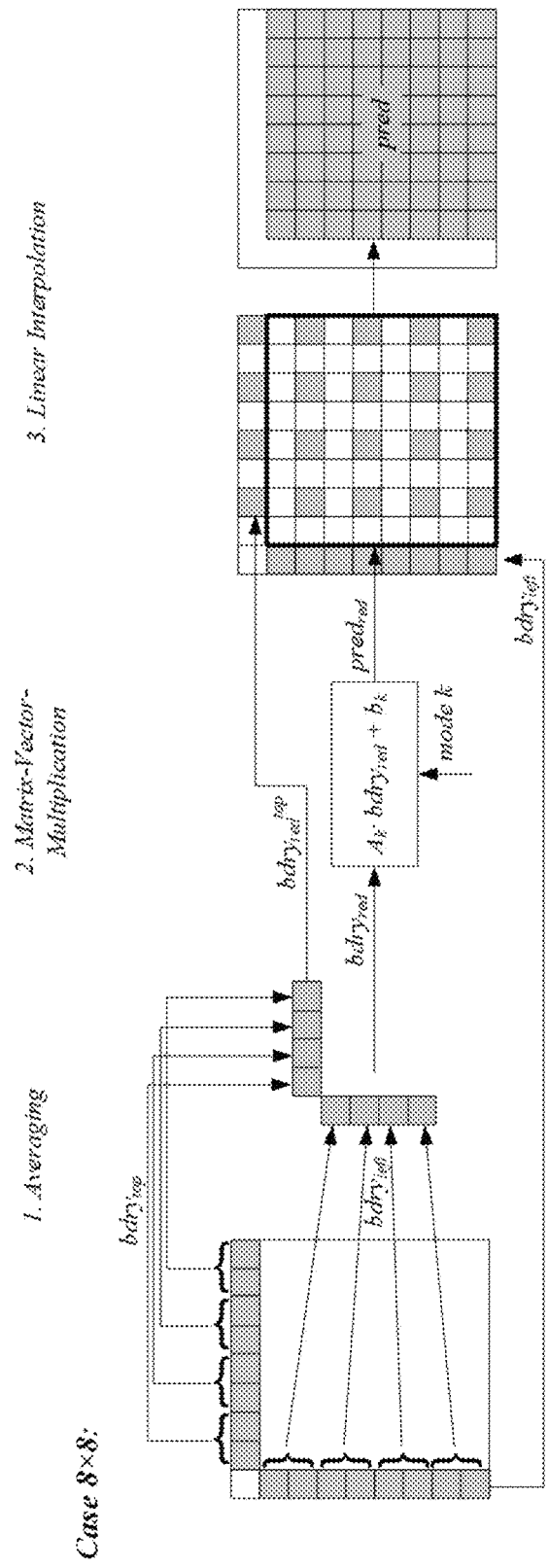
FIG. 4 shows an example of ALWIP for 8×8 blocks.

2. Given an 8×8 block, as shown in FIG. 4, ALWIP takes four averages along each axis of the boundary. The resulting eight input samples enter the matrix vector multiplication. The matrices are taken from the set $S_1$. This yields 16 samples on the odd positions of the prediction block. Thus, a total of (8·16)/(8·8)=2 multiplications per sample are performed. After adding an offset, these samples are interpolated vertically by using the reduced top boundary. Horizontal interpolation follows by using the original left boundary.

Figure 5:
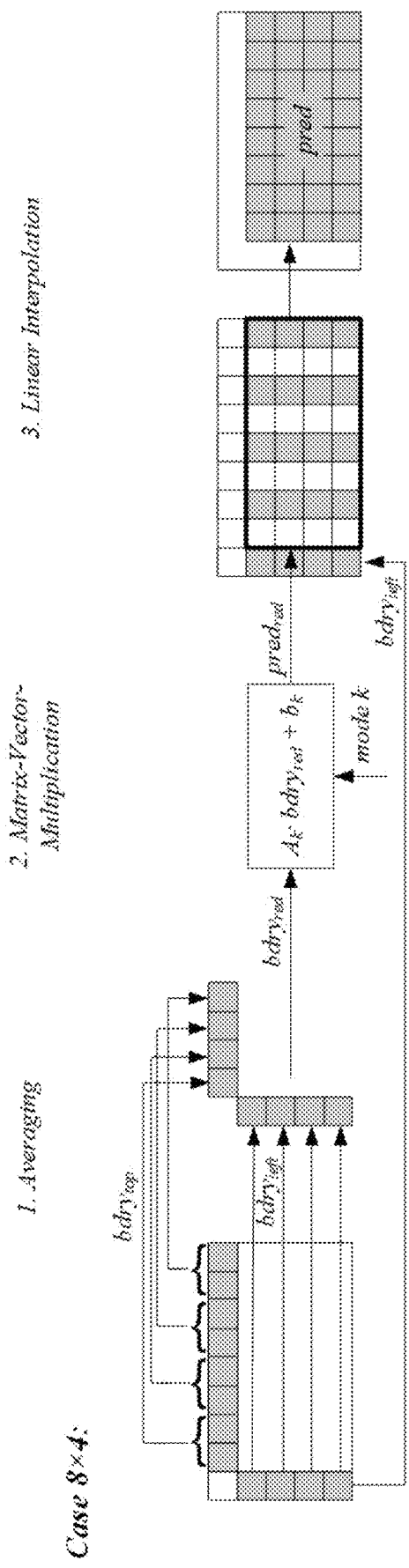
FIG. 5 shows an example of ALWIP for 8×4 blocks.

3. Given an 8×4 block, as shown in FIG. 5, ALWIP takes four averages along the horizontal axis of the boundary and the four original boundary values on the left boundary. The resulting eight input samples enter the matrix vector multiplication. The matrices are taken from the set $S_1$. This yields 16 samples on the odd horizontal and each vertical positions of the prediction block. Thus, a total of (8·16)/(8·4)=4 multiplications per sample are performed. After adding an offset, these samples are interpolated horizontally by using the original left boundary. The transposed case is treated accordingly.

Figure 6:
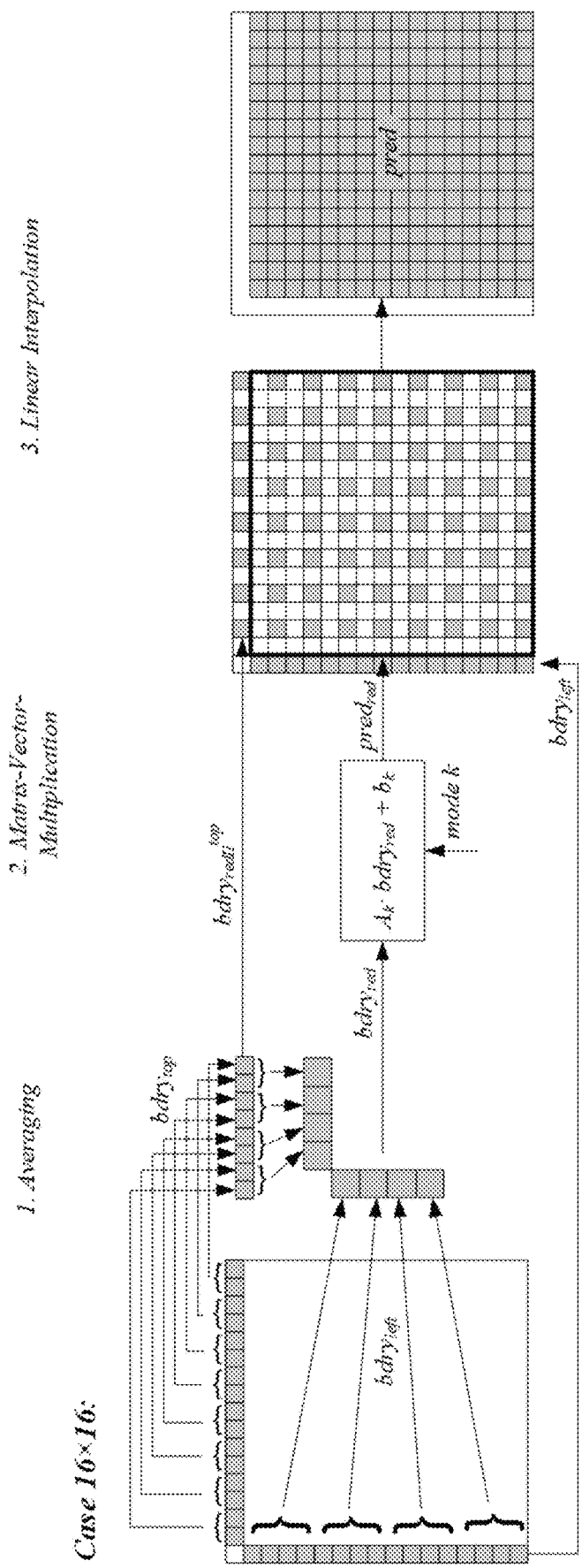
FIG. 6 shows an example of ALWIP for 16×16 blocks.

4. Given a 16×16 block, as shown in FIG. 6, ALWIP takes four averages along each axis of the boundary. The resulting eight input samples enter the matrix vector multiplication. The matrices are taken from the set $S_2$. This yields 64 samples on the odd positions of the prediction block. Thus, a total of (8·64)/(16·16)=2 multiplications per sample are performed. After adding an offset, these samples are interpolated vertically by using eight averages of the top boundary. Horizontal interpolation follows by using the original left boundary. The interpolation process, in this case, does not add any multiplications. Therefore, totally, two multiplications per sample are associated with calculating ALWIP prediction.

For larger shapes, the procedure is essentially the same and it is easy to check that the number of multiplications per sample is less than four.

For W×8 blocks with W>8, only horizontal interpolation may be necessary to be used as the samples are given at the odd horizontal and each vertical position.

Finally, for W×4 blocks with W>8, let A_kbe the matrix that arises by leaving out every row that corresponds to an odd entry along the horizontal axis of the downsampled block. Thus, the output size is 32 and again, only horizontal interpolation remains to be performed.

The transposed cases are treated accordingly.

2.2.2.3. Syntax and Semantics

The portions below in bold and underlines indicate proposed modifications to the standard.

7.3.6.5 Coding Unit Syntax

| | Descriptor |
|---|---|
| coding_unit( x0, y0, cbWidth, cbHeight, treeType ) { | |
|   if( tile_group_type != I \| \| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && tile_group_type != I ) | |
|       pred_mode_flag | ae(v) |
|     if( ( ( tile_group_type = = I && cu_skip_flag[ x0 ][ y0 ] = =0 ) \| \| | |
|     ( tile_group_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \| \| treeType = = DUAL_TREE_LUMA ) { | |
|         <u>if( abs( Log2( cbWidth ) − Log2( cbHeight ) ) <= 2 )</u> | |
|           <u>intra lwip flag[ x0 ][ y0 ]</u> | ae(v) |
|         <u>if( intra lwip flag[ x0 ][ y0 ] ) {</u> | |
|           <u>intra lwip mpm flag[ x0 ][ y0 ]</u> | ae(v) |
|           <u>if( intra lwip mpm flag[ x0 ][ y0 ] )</u> | |
|             <u>intra lwip mpm idx[ x0 ][ y0 ]</u> | ae(v) |
|           <u>else</u> | |
|             <u>intra lwip mpm remainder[ x0 ][ y0 ]</u> | ae(v) |
|         <u>} else {</u> | |
|         if( ( y0 % CtbSizeY ) > 0 ) | |
|           intra_luma_ref_idx[ x0 ][ y0 ] | ae(v) |
|         if (intra_luma_ref_idx[ x0 ][ y0 ] = = 0 && | |
|         ( cbWidth <= MaxTbSizeY \| \| cbHeight <= MaxTbSizeY ) && | |
|         ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] = = 1 && | |
|         cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] = = 0 && | |
|         intra_subpartitions_mode_flag[ x0 ][ y0 ] = = 0 ) | |
|           intra_luma_mpm_flag[ x0 ][ y0 ] | ae(v) |
|         if( intra_luma_mpm_flag[ x0 ][ y0 ] ) | |

-continued

| | Descriptor |
|---|---|
|       intra_luma_mpm_idx[ x0 ][ y0 ]<br>    else<br>      intra_luma_mpm_remainder[ x0 ][ y0 ]<br>   }<br> }<br>  if( treeType = = SINGLE_TREE \|\| treeType = =<br>DUAL_TREE_CHROMA )<br>    intra_chroma_pred_mode[ x0 ][ y0 ]<br>  }<br> } else if( treeType != DUAL_TREE_CHROMA ) { /* MODE_INTER or<br>MODE_IBC */<br>  ...<br> }<br>} | ae(v)<br><br>ae(v)<br><br><br><br><br><br>ae(v) |

2.2.3. Multiple Reference Line (MRL)

Figure 7:
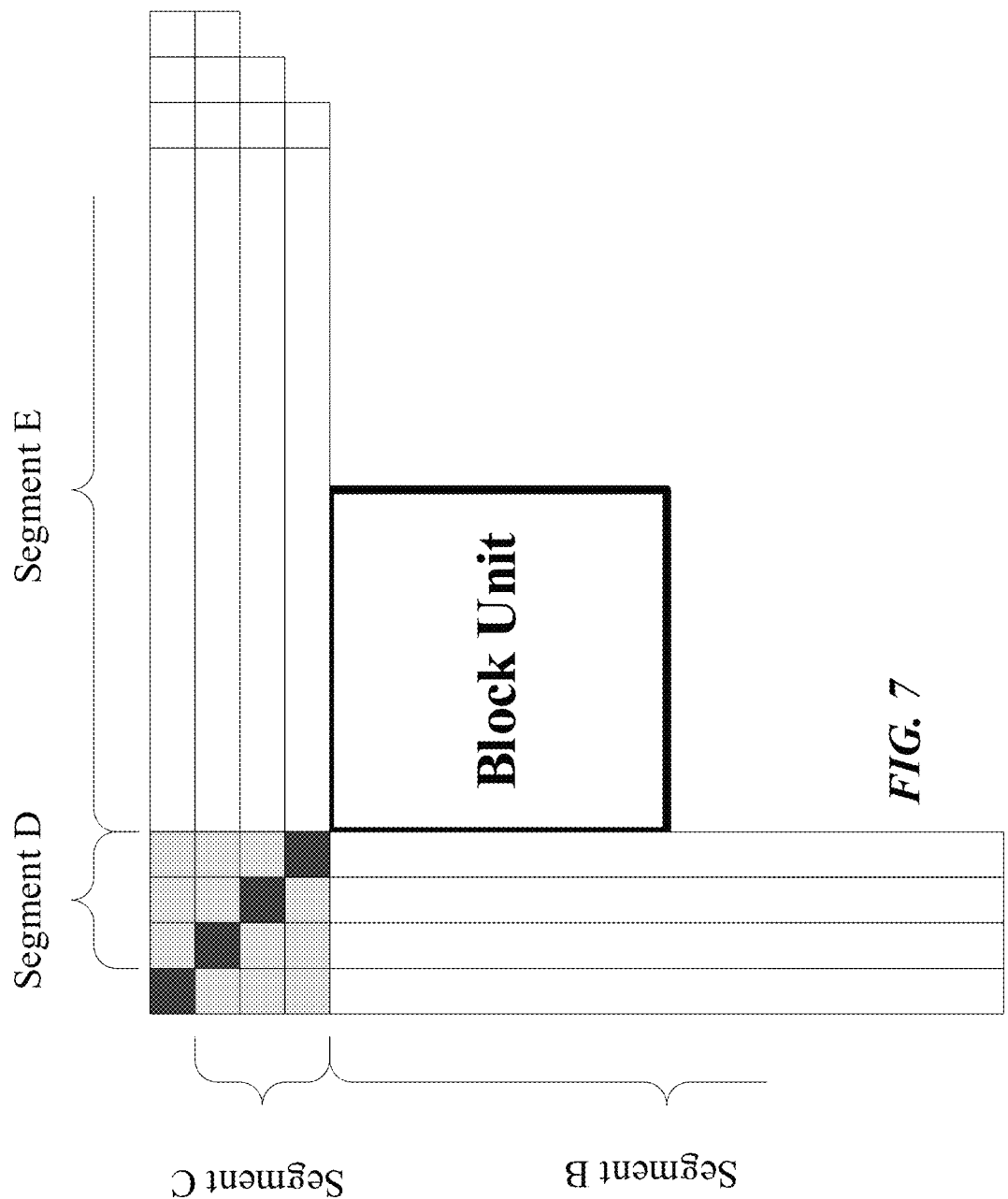
FIG. 7 shows an example of reference lines neighboring a prediction block.

Multiple reference line (MRL) intra prediction uses more reference lines for intra prediction. In FIG. 7, an example of 4 reference lines is depicted, where the samples of segments A and F are not fetched from reconstructed neighbouring samples but padded with the closest samples from Segment B and E, respectively. HEVC intra-picture prediction uses the nearest reference line (e.g., reference line 0). In MRL, 2 additional lines (reference line 1 and reference line 3) are used.

The index of selected reference line (mrl_idx) is signaled and used to generate intra predictor. For reference line index, which is greater than 0, only include additional reference line modes in most probable mode (MPM) list and only signal MPM index without remaining mode. The reference line index is signaled before intra prediction modes, and Planar and DC modes are excluded from intra prediction modes in case a nonzero reference line index is signaled.

MRL is disabled for the first line of blocks inside a coding tree unit (CTU) to prevent using extended reference samples outside the current CTU line. Also, PDPC is disabled when additional line is used.

2.2.4. Intra Subblock Partitioning (ISP)

Figure 8:
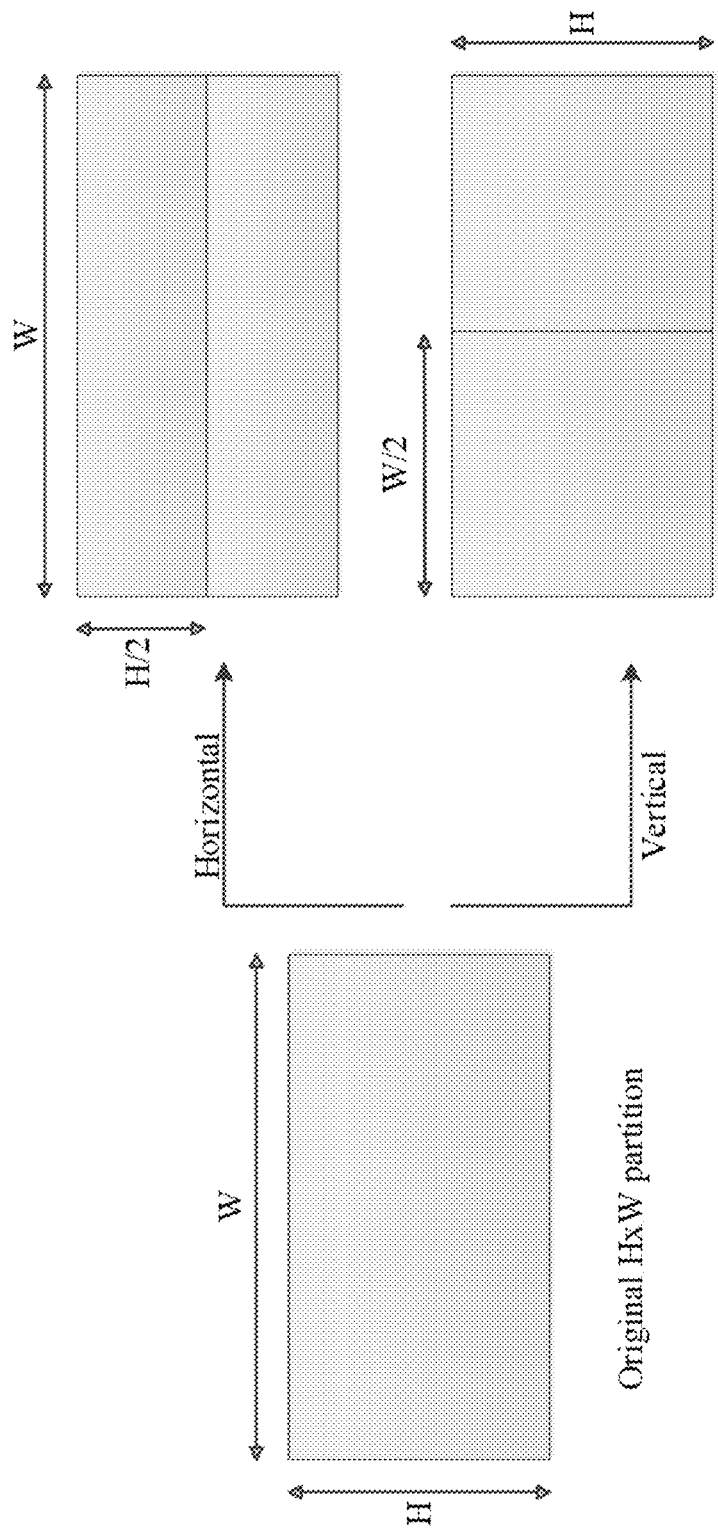
FIG. 8 shows examples of divisions of blocks.
Figure 9:
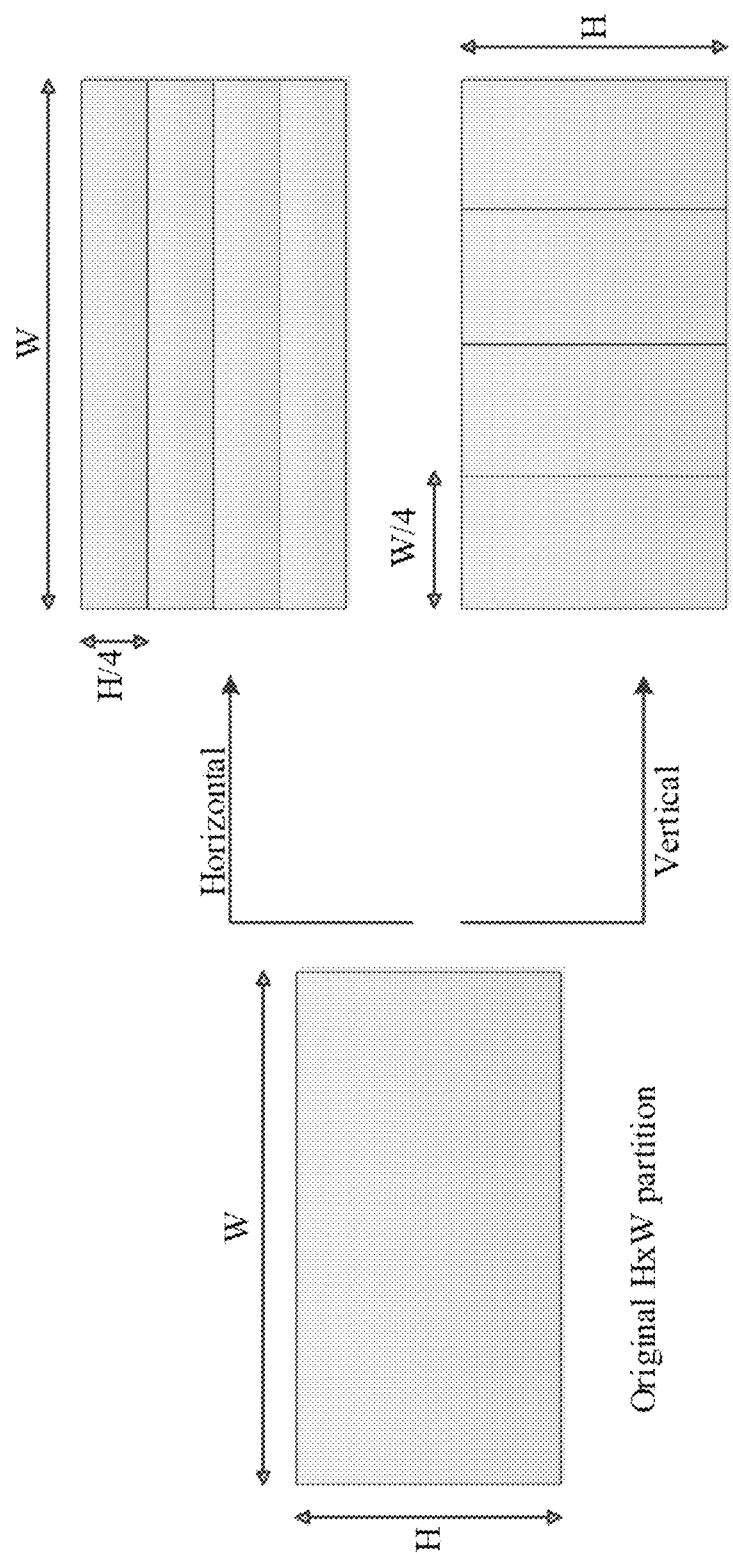
FIG. 9 shows examples of divisions of blocks with exceptions.

In some embodiments, ISP is used to divide luma intra-predicted blocks vertically or horizontally into 2 or 4 sub-partitions depending on the block size dimensions, as shown in Table 1. FIG. 8 and FIG. 9 show examples of the two possibilities. All sub-partitions fulfill the condition of having at least 16 samples. For block sizes, 4×N or N×4 (with N>8), if allowed, the 1×N or N×1 sub-partition may exist.

TABLE 1

Number of sub-partitions depending on the block size
(denoted maximum transform size by maxTBSize)

| Splitting direction | Block Size | Number of Sub-Partitions |
|---|---|---|
| N/A | minimum transform size | Not divided |
| 4 × 8: horizontal<br>8 × 4: vertical | 4 × 8 and 8 × 4 | 2 |
| Signaled | If neither 4 × 8 nor 8 × 4, and W <= maxTBSize and H <= maxTBSize | 4 |
| Horizontal | If not above cases and H > maxTBSize | 4 |
| Vertical | If not above cases and H > maxTBSize | 4 |

For each of these sub-partitions, a residual signal is generated by entropy decoding the coefficients sent by the encoder and then invert quantizing and invert transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

TABLE 2

Specification of trTypeHor and trTypeVer
depending on predModeIntra

| predModeIntra | trTypeHor | trTypeVer |
|---|---|---|
| INTRA_PLANAR,<br>INTRA_ANGULAR31,<br>INTRA_ANGULAR32,<br>INTRA_ANGULAR34,<br>INTRA_ANGULAR36,<br>INTRA_ANGULAR37 | ( nTbW >= 4 &&<br>nTbW <= 16 ) ?<br>DST-VII : DCT-II | ( nTbH >= 4 &&<br>nTbH <= 16 ) ?<br>DST-VII : DCT-II |
| INTRA_ANGULAR33,<br>INTRA_ANGULAR35 | DCT-II | DCT-II |
| INTRA_ANGULAR2,<br>INTRA_ANGULAR4, ... ,<br>INTRA_ANGULAR28,<br>INTRA_ANGULAR30,<br>INTRA_ANGULAR39,<br>INTRA_ANGULAR41, ... ,<br>INTRA_ANGULAR63,<br>INTRA_ANGULAR65 | ( nTbW >= 4 &&<br>nTbW <= 16 ) ?<br>DST-VII : DCT-II | DCT-II |
| INTRA_ANGULAR3,<br>INTRA_ANGULAR5, ... ,<br>INTRA_ANGULAR27,<br>INTRA_ANGULAR29,<br>INTRA_ANGULAR38,<br>INTRA_ANGULAR40, ... ,<br>INTRA_ANGULAR64,<br>INTRA_ANGULAR66 | DCT-II | ( nTbH >= 4 &&<br>nTbH <= 16 ) ?<br>DST-VII : DCT-II |

2.2.4.1. Syntax and Semantics

The portions below in bold and underlines indicate proposed modifications to the standard.

7.3.7.5 Coding Unit Syntax

| | Descriptor |
|---|---|
| coding_unit( x0, y0, cbWidth, cbHeight, treeType ) { | |
|   if( slice_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && slice_type != I ) | |
|       pred_mode_flag | ae(v) |
|     if( ( ( slice_type = = I && cu_skip_flag[ x0 ][ y0 ] = =0 ) \|\| | |
|       ( slice_type != I && CuPredMode[ x0 ][ y0 ] != MODE_INTRA ) ) | |
|   && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY | |
|   && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|         if( ( y0 % CtbSizeY ) > 0 ) | |
|           intra_luma_ref_idx[ x0 ][ y0 ] | ae(v) |
|         if (intra luma ref idx[ x0 ][ y0 ] = = 0 && | |
|           ( cbWidth <= MaxTbSizeY \|\| cbHeight <= MaxTbSizeY ) && | |
|           **( cbWidth * cbHeight > MinTbSizeY * MinTbSizeY ))** | |
|           intra subpartitions mode flag[ x0 ][ y0 ] | ae(v) |
|         if( intra subpartitions mode flag[ x0 ][ y0 ] = = 1 && | |
|           cbWidth <= MaxTbSizeY && cbHeight <= MaxTbSizeY ) | |
|           intra subpartitions split flag[ x0 ][ y0 ] | ae(v) |
|         if( intra_luma_ref_idx[ x0 ][ y0 ] = = 0 && | |
|           intra_subpartitions_mode_flag[ x0 ][ y0 ] = = 0 ) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType = = SINGLE_TREE \|\| treeType = = DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER or MODE_IBC */ | |
|   ... | |
|   } | |
| ... | |
| } | | intra_subpartitions_mode_flag[x0][y0] equal to 1 specifies that the current intra coding unit is partitioned into NumIntraSubPartitions[x0][y0] rectangular transform block subpartitions. intra_subpartitions_mode_flag[x0][y0] equal to 0 specifies that the current intra coding unit is not partitioned into rectangular transform block subpartitions.

When intra_subpartitions_mode_flag[x0][y0] is not present, it is inferred to be equal to 0.

intra_subpartitions_split_flag[x0][y0] specifies whether the intra subpartitions split type is horizontal or vertical. When intra_subpartitions_split_flag[x0][y0] is not present, it is inferred as follows:

If cbHeight is greater than MaxTbSizeY, intra_subpartitions_split_flag[x0][y0] is inferred to be equal to 0.

Otherwise (cbWidth is greater than MaxTbSizeY), intra_subpartitions_split_flag[x0][y0] is inferred to be equal to 1.

The variable IntraSubPartitionsSplitType specifies the type of split used for the current luma coding block as illustrated in Table 3. IntraSubPartitionsSplitType is derived as follows:

If intra_subpartitions_mode_flag[x0][y0] is equal to 0, IntraSubPartitionsSplitType is set equal to 0.

Otherwise, the IntraSubPartitionsSplitType is set equal to 1+intra_subpartitions_split_flag[x0][y0].

TABLE 3

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions an intra luma coding block is divided into. NumIntraSubPartitions is derived as follows:
  If IntraSubPartitionsSplitType is equal to ISP_NO_SPLIT, NumIntraSubPartitions is set equal to 1.
  Otherwise, if one of the following conditions is true, NumIntraSubPartitions is set equal to 2:
    cbWidth is equal to 4 and cbHeight is equal to 8,
    cbWidth is equal to 8 and cbHeight is equal to 4.
  Otherwise, NumIntraSubPartitions is set equal to 4.

2.3. Transform Coding in VVC 2.3.1. Multiple Transform Set (MTS) in VVC 2.3.1.1. Explicit Multiple Transform Set (MTS)

In some embodiments, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

In addition to discrete cosine transform (DCT)-II which has been employed in HEVC, a Multiple Transform Selection (MTS) scheme is used for residual coding both inter and intra coded blocks. It uses multiple selected transforms from the DCT8/DST7. The newly introduced transform matrices are discrete sine transform (DST)-VII and DCT-VIII. The Table 4 below shows the basis functions of the selected DST/DCT.

TABLE 4

Basis functions of transform matrices used in VVC.

| Transform Type | Basis function $T_i(j)$, $i, j = 0, 1, \ldots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ where, $\omega_0 = \begin{cases} \sqrt{\dfrac{2}{N}} & i = 0 \\ 1 & i \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at sequence parameter set (SPS) level for intra and inter, respectively. When MTS is enabled at SPS, a coding unit (CU) level flag is signaled to indicate whether MTS is applied or not. Here, MTS is applied only for luma. The MTS CU level flag is signaled when the following conditions are satisfied:

Both width and height smaller than or equal to 32
  CBF flag is equal to one

If MTS CU flag is equal to zero, then DCT2 is applied in both directions. However, if MTS CU flag is equal to one, then two other flags are additionally signaled to indicate the transform type for the horizontal and vertical directions, respectively. Transform and signaling mapping table as shown in Table 5. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 5

Mapping of decoded value of tu_mts_idx and corresponding transform matrices for the horizontal and vertical directions.

| Bin string of tu_mts_idx | tu_mts_idx | Intra/inter Horizontal | Vertical |
|---|---|---|---|
| 0 | 0 | DCT2 | |
| 1 0 | 1 | DST7 | DST7 |
| 1 1 0 | 2 | DCT8 | DST7 |
| 1 1 1 0 | 3 | DST7 | DCT8 |
| 1 1 1 1 | 4 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

In addition to the cases wherein different transforms are applied, VVC also supports a mode called transform skip (TS) which is like the concept of TS in the HEVC. TS is treated as a special case of MTS.

2.3.2. Reduced Secondary Transform (RST)

2.3.2.1. Non-Separable Secondary Transform (NSST)

Figure 10:
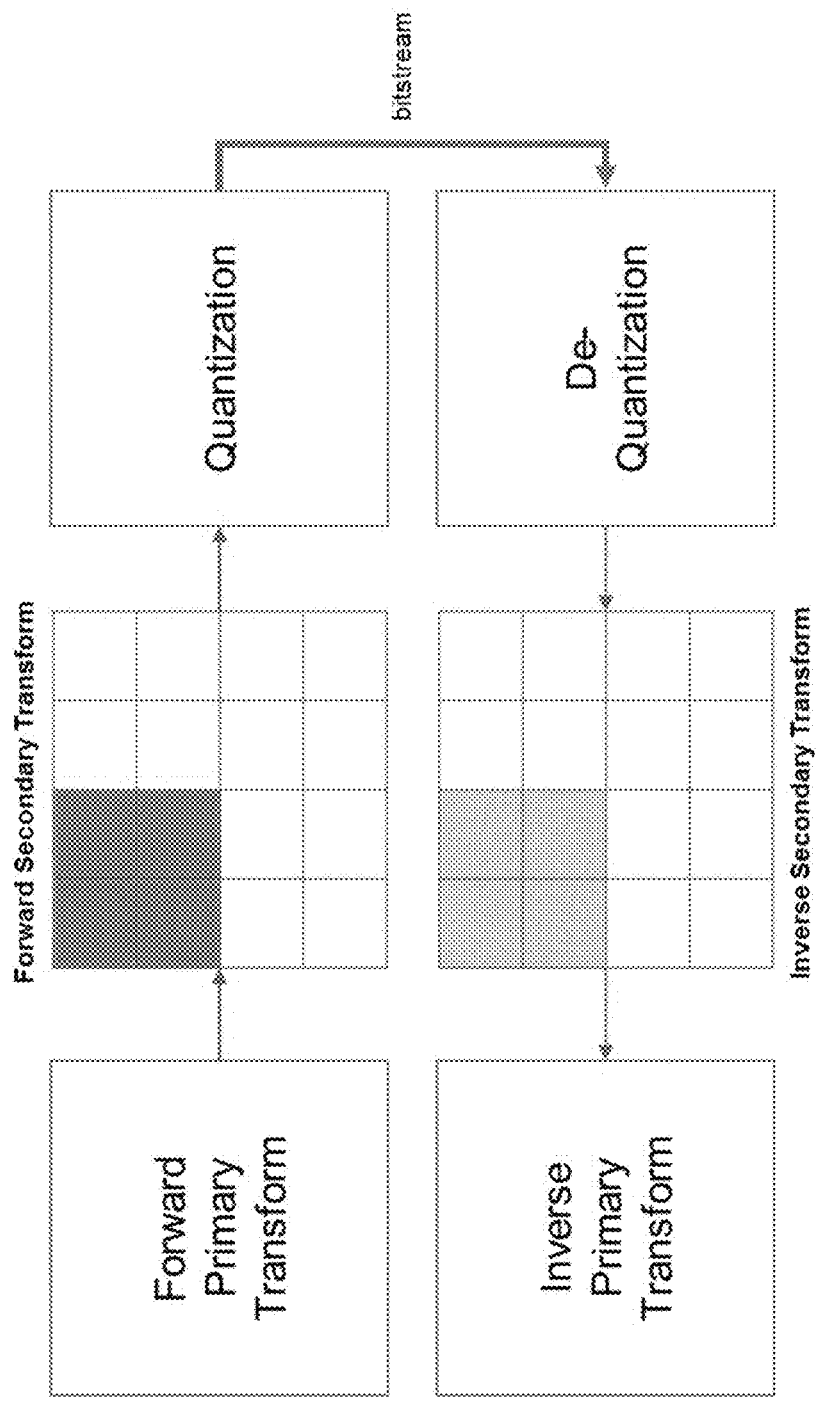
FIG. 10 shows examples of secondary transforms.

In some embodiments, secondary transform is applied between forward primary transform and quantization (at encoder) and between de-quantization and invert primary transform (at decoder side). As shown in FIG. 10, 4×4 (or 8×8) secondary transform is performed depends on block size. For example, 4×4 secondary transform is applied for small blocks (e.g., min (width, height)<8) and 8×8 secondary transform is applied for larger blocks (e.g., min (width, height)>4) per 8×8 block.

Application of a non-separable transform is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$:

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T$$

The non-separable transform is calculated as $\vec{F} = T \cdot \vec{X}$ where $\vec{F}$ indicates the transform coefficient vector, and T is a 16×16 transform matrix. The 16×1 coefficient vector F is subsequently re-organized as 4×4 block using the scanning order for that block (horizontal, vertical or diagonal).

The coefficients with smaller index will be placed with the smaller scanning index in the 4×4 coefficient block. There are totally 35 transform sets and 3 non-separable transform matrices (kernels) per transform set are used. The mapping from the intra prediction mode to the transform set is pre-defined. For each transform set, the selected non-separable secondary transform (NSST) candidate is further specified by the explicitly signaled secondary transform index. The index is signaled in a bit-stream once per Intra CU after transform coefficients.

2.3.2.2. Example Reduced Secondary Transform (RST)

Figure 11:
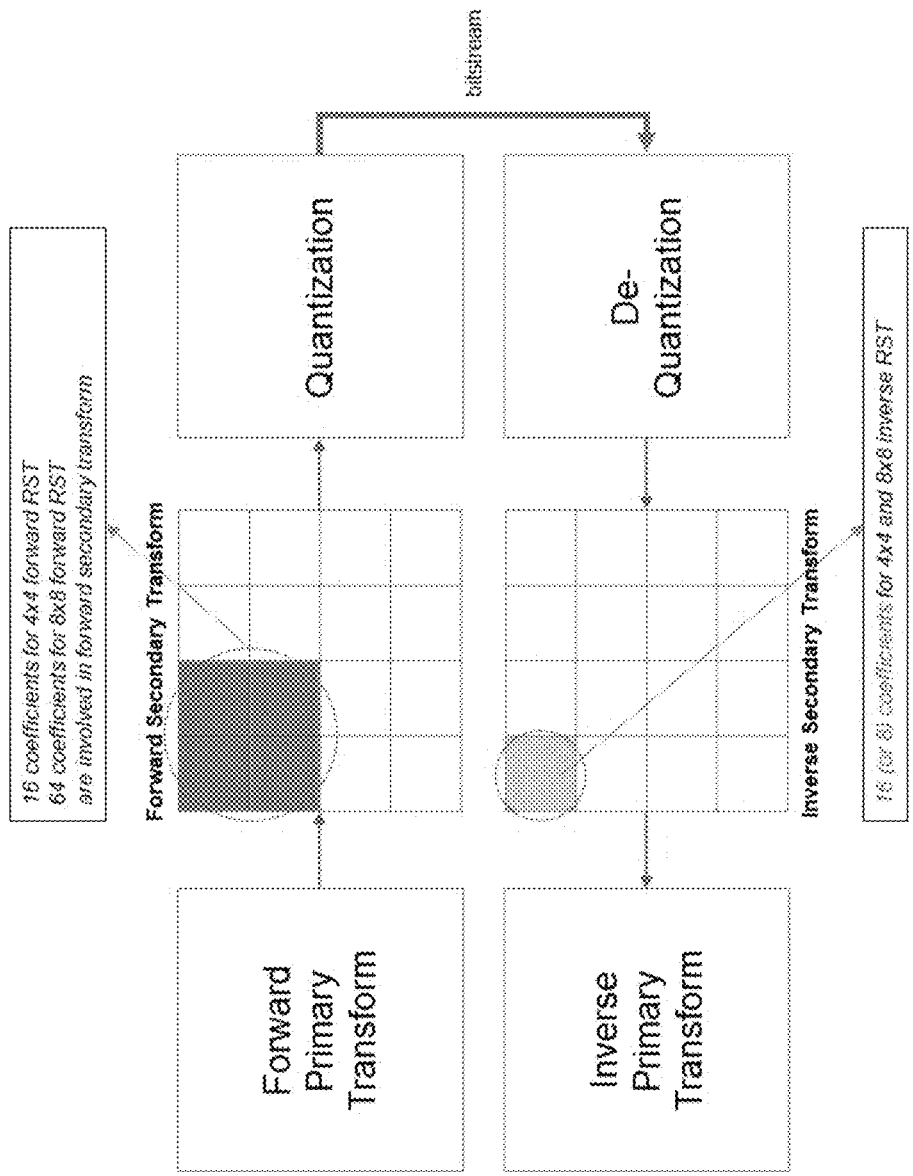
FIG. 11 shows an example of reduced secondary transform (RST).

The RST (a.k.a. Low Frequency Non-Separable Transform (LFNST)) uses four transform sets (instead of 35 transform sets) mapping. In some embodiments, 16×64 (further reduced to 16×48) and 16×16 matrices are employed. For notational convenience, the 16×64 (reduced to 16×48) transform is denoted as RST8×8 and the 16×16 one as RST4×4. FIG. 11 shows an example of RST.

2.3.2.2.1. RST Computation

The main idea of a Reduced Transform (RT) is to map an N dimensional vector to an R dimensional vector in a different space, where R/N (R<N) is the reduction factor.

Figure 12:
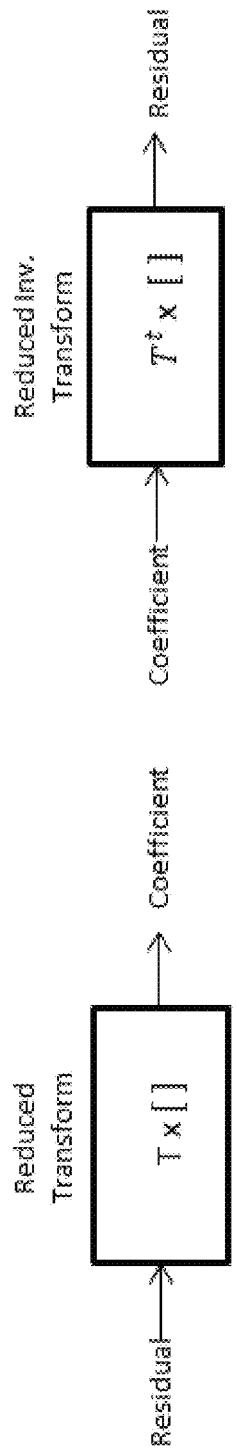
FIG. 12 shows examples of forward and invert reduced transforms.

The RT matrix is an R×N matrix as follows:

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$

where the R rows of the transform are R bases of the N dimensional space. The invert transform matrix for RT is the transpose of its forward transform. The forward and invert RT are depicted in FIG. 12.

The RST8×8 with a reduction factor of 4 (¼ size) can be applied. Hence, instead of 64×64, which is conventional 8×8 non-separable transform matrix size, 16×64 direct matrix is used. In other words, the 64×16 invert RST matrix is used at the decoder side to generate core (primary) transform coefficients in 8×8 top-left regions. The forward RST8×8 uses 16×64 (or 8×64 for 8×8 block) matrices so that it produces non-zero coefficients only in the top-left 4×4 region within the given 8×8 region. In other words, if RST is applied then the 8×8 region except the top-left 4×4 region will have only zero coefficients. For RST4×4, 16×16 (or 8×16 for 4×4 block) direct matrix multiplication is applied.

An invert RST is conditionally applied when the following two conditions are satisfied:

Block size is greater than or equal to the given threshold (W>=4 && H>=4)

Transform skip mode flag is equal to zero

If both width (W) and height (H) of a transform coefficient block is greater than 4, then the RST8×8 is applied to the top-left 8×8 region of the transform coefficient block. Otherwise, the RST4×4 is applied on the top-left min(8, W)×min(8, H) region of the transform coefficient block.

If RST index is equal to 0, RST is not applied. Otherwise, RST is applied, of which kernel is chosen with the RST index. The RST selection method and coding of the RST index are explained later.

Furthermore, RST is applied for intra CU in both intra and inter slices, and for both Luma and Chroma. If a dual tree is enabled, RST indices for Luma and Chroma are signaled separately. For inter slice (the dual tree is disabled), a single RST index is signaled and used for both Luma and Chroma.

2.3.2.2.2. Restriction of RST

When ISP mode is selected, RST is disabled, and RST index is not signaled, because performance improvement was marginal even if RST is applied to every feasible partition block. Furthermore, disabling RST for ISP-predicted residual could reduce encoding complexity.

2.3.2.2.3. RST Selection

An RST matrix is chosen from four transform sets, each of which consists of two transforms. Which transform set is applied is determined from intra prediction mode as the following:

(1) If one of three CCLM modes is indicated, transform set 0 is selected.

(2) Otherwise, transform set selection is performed according to the following table:

| The transform set selection table | |
|---|---|
| IntraPredMode | Tr. set index |
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

The index to access the Table, denoted as IntraPredMode, have a range of [−14, 83], which is a transformed mode index used for wide angle intra prediction.

2.3.2.2.4. RST Matrices of Reduced Dimension

Figure 13:
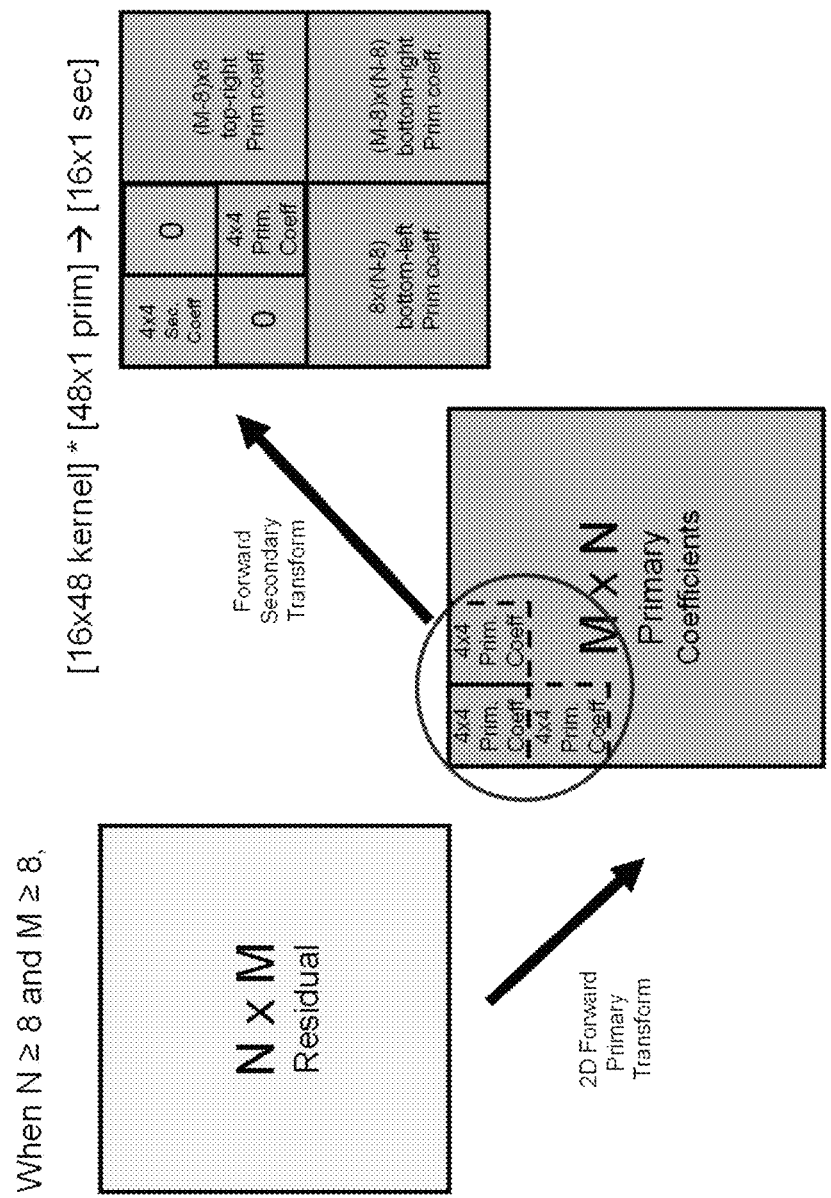
FIG. 13 shows an example of forward RST.

As a further simplification, 16×48 matrices are applied instead of 16×64 with the same transform set configuration, each of which takes 48 input data from three 4×4 blocks in a top-left 8×8 block excluding right-bottom 4×4 block, such as shown in FIG. 13.

2.3.2.2.5. RST Signaling

Figure 14:
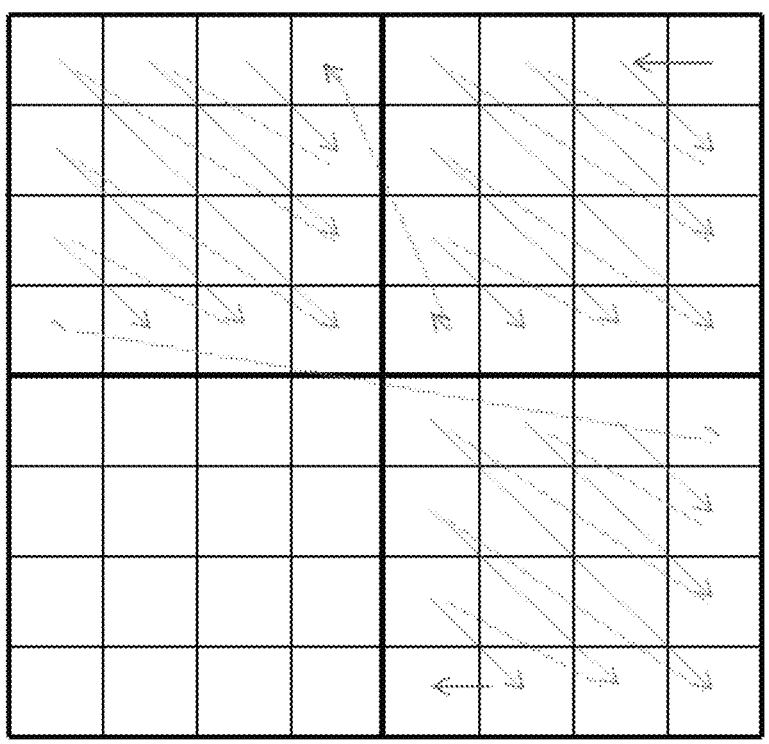
FIG. 14 shows an example of RST scanning.

The forward RST8×8 with R=16 uses 16×64 matrices so that it produces non-zero coefficients only in the top-left 4×4 region within the given 8×8 region. In other words, if RST is applied then the 8×8 region except the top-left 4×4 region generates only zero coefficients. As a result, RST index is not coded when any non-zero element is detected within 8×8 block region other than top-left 4×4 (which is depicted in FIG. 14) because it implies that RST was not applied. In such a case, RST index is inferred to be zero.

2.3.2.2.6. Zero-Out Range

Usually, before applying the invert RST on a 4×4 sub-block, any coefficient in the 4×4 sub-block may be non-zero. However, it is constrained that in some cases, some coefficients in the 4×4 sub-block are zero before invert RST is applied on the sub-block.

Let nonZeroSize be a variable. Any coefficient with the index no smaller than nonZeroSize when it is rearranged into a 1-D array before the invert RST, can be zero.

When nonZeroSize is equal to 16, there is no zero-out constrain on the coefficients in the top-left 4×4 sub-block.

In some embodiments, when the current block size is 4×4 or 8×8, nonZeroSize is set equal to 8. For other block dimensions, nonZeroSize is set equal to 16.

2.3.2.2.7. Description of RST

The portions below in bold and underlines indicate proposed modifications to the standard.

7.3.2.3 Sequence Parameter Set RBSP Syntax

|  | Descriptor |
|---|---|
| seq_parameter_set_rbsp( ) { | |
| ...... | |
|   sps_mts_enabled_flag | u(1) |
|   if( sps_mts_enabled_flag ) { | |
|     sps_explicit_mts_intra_enabled_flag | u(1) |
|     sps_explicit_mts_inter_enabled_flag | u(1) |
|   } | |
| ... | |
|   <u>sps st enabled flag</u> | u(1) |
| ... | |
| } | |

7.3.7.11 Residual Coding Syntax

|  | Descriptor |
|---|---|
| residual_coding( x0, y0, log2TbWidth, log2TbHeight, cIdx ) { | |
| ... | |
|   if( coded_sub_block_flag[ xS ][ yS ] && ( n > 0 \|\| !inferSbDcSigCoeffFlag ) && | |
|     ( xC != LastSignificantCoeffX \|\| yC != LastSignificantCoeffY ) ) { | |
|     sig_coeff_flag[ xC ][ yC ] | ae(v) |
|     remBinsPass1− − | |
|     if( sig_coeff_flag[ xC ][ yC ] ) | |
|       inferSbDcSigCoeffFlag = 0 | |
|   } | |
|   if( sig_coeff_flag[ xC ][ yC ] ) { | |
|     <u>if( !transform skip flag[ x0 ][ y0 ] ) {</u> | |
|     <u>numSigCoeff++</u> | |
|     <u>if( ( ( ( log2TbWidth == 2 && log2TbHeight == 2 ) \|\|</u> | |
| <u>( log2TbWidth == 3 && log2TbHeight == 3 ) ) && n >= 8 && i == 0 ) \|\|</u> | |
| <u>( ( log2TbWidth >= 3 && log2TbHeight >= 3 && ( i == 1 \|\| i == 2 ) ) ) ) {</u> | |
|       <u>numZeroOutSigCoeff++</u> | |
|     <u>}</u> | |
|     <u>}</u> | |
|     abs_level_gt1_flag[ n ] | ae(v) |
| ... | |

7.3.7.5 Coding unit syntax

|  | Descriptor |
|---|---|
| coding_unit( x0, y0, cbWidth, cbHeight, treeType ) { | |
| ... | |
|   if( !pcm_flag[ x0 ][ y0 ] ) { | |
|     if( CuPredMode[ x0 ][ y0 ] != MODE_INTRA && merge_flag[ x0 ][ y0 ] == 0 ) | |
|       cu_cbf | ae(v) |
|     if( cu_cbf ) { | |
|       if( CuPredMode[ x0 ][ y0 ] == MODE_INTER && sps_sbt_enabled_flag && | |
|         !ciip_flag[ x0 ][ y0 ] ) { | |
|         if( cbWidth <= MaxSbtSize && cbHeight <= MaxSbtSize ) { | |
|           allowSbtVerH = cbWidth >= 8 | |
|           allowSbtVerQ = cbWidth >= 16 | |
|           allowSbtHorH = cbHeight >= 8 | |
|           allowSbtHorQ = cbHeight >= 16 | |
|           if( allowSbtVerH \|\| allowSbtHorH \|\| allowSbtVerQ \|\| allowSbtHorQ ) | |
|             cu_sbt_flag | ae(v) |
|         } | |
|         if( cu_sbt_flag ) { | |
|           if( ( allowSbtVerH \|\| allowSbtHorH ) && ( allowSbtVerQ \|\| allowSbtHorQ) ) | |
|             cu_sbt_quad_flag | ae(v) |
|           if( ( cu_sbt_quad_flag && allowSbtVerQ && allowSbtHorQ ) \|\| | |
|             ( !cu_sbt_quad_flag && allowSbtVerH && allowSbtHorH ) ) | |
|             cu_sbt_horizontal_flag | ae(v) |
|           cu_sbt_pos_flag | ae(v) |
|         } | |
|       } | |

-continued

| | Descriptor |
|---|---|
| numZeroOutSigCoeff = 0 | |
| transform tree( x0, y0, cbWidth, cbHeight, treeType ) | |
| if( Min( cbWidth, cbHeight ) >= 4 && sps st enabled flag == 1 | |
| && CuPredMode[ x0 ][ y0 ] = = MODE INTRA | |
| && IntraSubPartitionsSplitType == ISP NO SPLIT ) { | |
| if( ( numSigCoeff > ( ( treeType == SINGLE TREE ) ? 2 : 1 ) ) | |
| && | |
| numZeroOutSigCoeff == 0 ) { | |
| st idx[ x0 ][ y0 ] | ae(v) |
| } | |
| } | |
| } | |
| } | |
| } | | sps_st_enabled_flag equal to 1 specifies that st_idx may be present in the residual coding syntax for intra coding units. sps_st_enabled_flag equal to 0 specifies that st_idx may not be present in the residual coding syntax for intra coding units.

st_idx[x0][y0] specifies which secondary transform kernel is applied between two candidate kernels in a selected transform set. st_idx[x0][y0] equal to 0 specifies that the secondary transform is not applied. The array indices x0, y0 specify the location (x0, y0) of the top-left sample of the considered transform block relative to the top-left sample of the picture.

When st_idx[x0][y0] is not present, st_idx[x0][y0] is inferred to be equal to 0.

Bins of st_idx are context-coded. More specifically, the following applies:

TABLE 5

Syntax elements and associated binarizations

| | Binarization | |
|---|---|---|
| Syntax element | Process | Input parameters |
| Syntax structure | ... | ... | ... |
| st idx[ ][ ] | TR | cMax = 2, cRiceParam = 0 |

TABLE 6

Assignment of ctxInc to syntax elements with context coded bins

| Syntax element | binIdx | | | | | |
|---|---|---|---|---|---|---|
| | 0 | 1 | 2 | 3 | 4 | >=5 |
| ... | ... | ... | ... ... ... ... | | | |
| st idx[ ][ ] | 0, 1, 4, 5 (clause 9.5.4.2.8) | 2, 3, 6, 7 (clause 9.5.4.2.8) | na | na | na | na |
| ... | ... | ... | ... ... ... ... | | | |

9.5.4.2.8 Derivation Process of ctxInc for the Syntax Element St_Idx

Inputs to this process are the colour component index cIdx, the luma or chroma location (x0, y0) specifying the top-left sample of the current luma or chroma coding block relative to the top-left sample of the current picture depending on cIdx, the tree type treeType, the luma intra prediction mode IntraPredModeY[x0][y0] as specified in clause 8.4.2, the syntax element intra_chroma_pred_mode[x0][y0] specifying the intra prediction mode for chroma samples as specified in clause 7.4.7.5, and the multiple transform selection index tu_mts_idx[x0][y0].

Output of this process is the variable ctxInc.

The variable intraModeCtx is derived as follows:

If cIdx is equal to 0, intraModeCtx is derived as follows:

$$\text{intraModeCtx} = (\text{IntraPredModeY}[x0][y0] <= 1)?1:0$$

Otherwise (cIdx is greater than 0), intraModeCtx is derived as follows:

$$\text{intraModeCtx} = (\text{intra\_chroma\_pred\_mode}[x0][y0] >= 4)?1:0$$

The variable mtsCtx is derived as follows:

$$\text{mtsCtx} = (tu\_mts\_idx[x0][y0] == 0 \&\& \text{treeType}!=\text{SINGLE\_TREE})?1:0$$

The variable ctxInc is derived as follows:

$$\text{ctxInc} = (\text{binIdx} << 1) + \text{intraModeCtx} + (\text{mtsCtx} << 2)$$

2.3.2.2.8. Summary of RST Usage

The portions below in bold and underlines indicate proposed modifications to the standard.

RST may be enabled only when the number of non-zero coefficients in one block is greater than 2 and 1 for single and separate tree, respectively. In addition, the following restrictions of locations of non-zero coefficients for RST applied coding groups (CGs) can be applied when RST is enabled.

TABLE 7

Usage of RST

Figure 16:
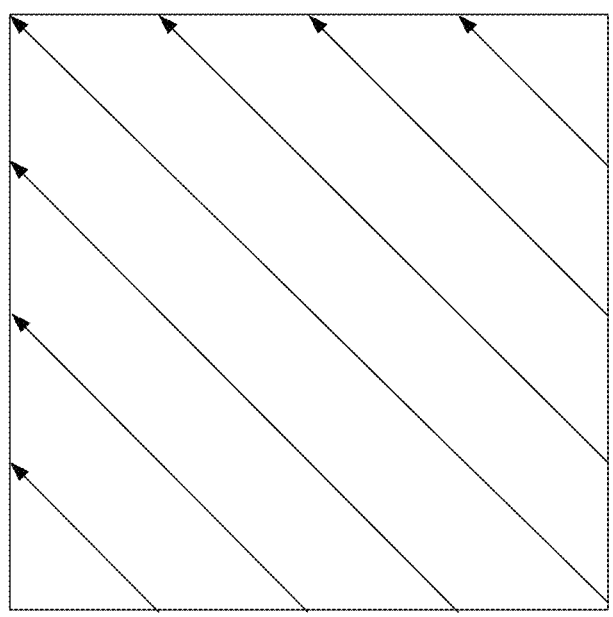
FIG. 16 shows an example of a scanning order.

| Block size | RST type | # of CGs that RST applied to | Which CG that RST applied to may have non-zero coeffs | Potential locations of non-zero coeffs in the CGs RST applied to (nonZeroSize relative to one CG) |
|---|---|---|---|---|
| 4 × 4 | RST4 × 4 (16 × 16) | 1 (Top-left 4 × 4) | Top-left 4 × 4 | First 8 in diagonal scan order (0 . . . 7 in FIG. 16, nonZeroSize = 8 |
| 4 × 8/8 × 4 | RST4 × 4 (16 × 16) | 1 (Top-left 4 × 4) | Top-left 4 × 4 | all, nonZeroSize = 16 |
| 4 × N and N × 4 (N > 8) | RST4 × 4 (16 × 16) | 2 (4 × N: up most 4 × 8; N × 4: left most 4 × 8) | 4 × N: up most 4 × 8; N × 4: left most 4 × 8 | all, nonZeroSize = 16 |
| 8 × 8 | RST8 × 8 (16 × 48) | 3 (with only 1 CG may have non-zero coeffs after forward RST) | Top-left 4 × 4 | First 8 in diagonal scan order (0 . . . 7 in FIG. 16, nonZeroSize = 8 |
| Others (W*H, W > 8, H > 8) | RST8 × 8 (16 × 48) | 3 (with only 1 CG may have non-zero coeffs after forward RST) | Top-left 4 × 4 | all, nonZeroSize = 16 |

2.3.3. Sub-Block Transform (SBT)

For an inter-predicted CU with cu_cbf equal to 1, cu_sbt_flag may be signaled to indicate whether the whole residual block or a sub-part of the residual block is decoded. In the former case, inter MTS information is further parsed to determine the transform type of the CU. In the latter case (e.g., SBT is enabled), a part of the residual block is coded with inferred adaptive transform and the other part of the residual block is zeroed out. The SBT is not applied to the combined inter-intra mode and triangular prediction mode.

Figure 15:
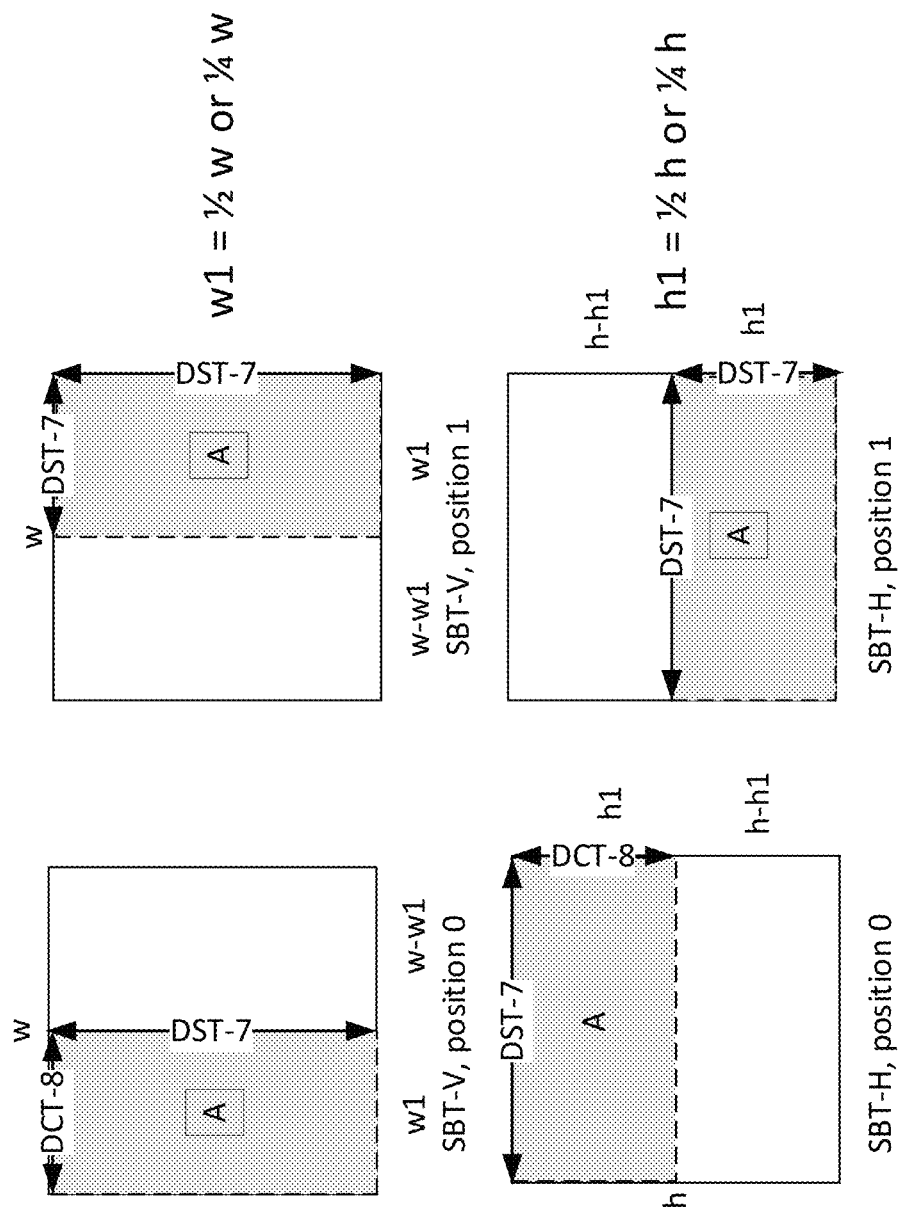
FIG. 15 shows examples of sub-block transform modes.

In sub-block transform, position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 15. For example, the horizontal and vertical transforms for SBT-V position 0 is DCT-8 and DST-7, respectively. When one side of the residual transform unit (TU) is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

2.3.3.1. Syntax Elements

The portions below in bold and underlines indicate proposed modifications to the standard.

7.3.7.5 Coding Unit Syntax

|  | Descriptor |
|---|---|
| coding_unit( x0, y0, cbWidth, cbHeight, treeType ) { | |
|   if( slice_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && slice_type != I ) | |
|       pred_mode_flag | ae(v) |
|     if( ( ( slice_type = = I && cu_skip_flag[ x0 ][ y0 ] = =0 ) \|\| | |
|       ( slice_type != I && CuPredMode[ x0 ][ y0 ] != MODE_INTRA ) ) | |
| &&  | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|   ... | |
|   } else if( treeType != DUAL_TREE_CHROMA ) { /* MODE_INTER or MODE_IBC */ | |
|   ... | |
|   } | |
|   if( !pcm_flag[ x0 ][ y0 ] ) { | |
|     if( CuPredMode[ x0 ][ y0 ] != MODE_INTRA && merge_flag[ x0 ][ y0 ] = = 0 ) | |
|       cu_cbf | ae(v) |
|     if( cu_cbf ) { | |
|       if( CuPredMode[ x0 ][ y0 ] = = MODE INTER && sps sbt enabled flag && | |
|         !ciip flag[ x0 ][ y0 ] ) { | |
|         if( cbWidth <= MaxSbtSize && cbHeight <= MaxSbtSize ) { | |
|           allowSbtVerH = cbWidth >= 8 | |
|           allowSbtVerQ = cbWidth >= 16 | |
|           allowSbtHorH = cbHeight >= 8 | |

|  | Descriptor |
|---|---|
| allowSbtHorQ = cbHeight >= 16 | |
| if( allowSbtVerH \|\| allowSbtHorH \|\| allowSbtVerQ \|\| allowSbtHorQ ) | |
|     cu_sbt_flag | ae(v) |
| } | |
| if( cu_sbt_flag ) { | |
|   if( ( allowSbtVerH \|\| allowSbtHorH ) && ( allowSbtVerQ \|\| allowSbtHorQ) ) | |
|     cu_sbt_quad_flag | ae(v) |
|   if( ( cu_sbt_quad_flag && allowSbtVerQ && allowSbtHorQ ) \|\| | |
|     ( !cu_sbt_quad_flag && allowSbtVerH && allowSbtHorH )) | |
|     cu_sbt_horizontal_flag | ae(v) |
|     cu_sbt_pos_flag | ae(v) |
|   } | |
| } | |
| transform_tree( x0, y0, cbWidth, cbHeight, treeType ) | |
| } | |
| } | |
| } | | cu_sbt_flag equal to 1 specifies that for the current coding unit, subblock. transform is used. cu_sbt_flag equal to 0 specifies that for the current coding unit, subblock transform is not used.

When cu_sbt_flag is not present, its value is inferred to be equal to 0.

NOTE—: When subblock transform is used, a coding unit is split into two transform units; one transform unit has residual data, the other does not have residual data.

cu_sbt_quad_flag equal to 1 specifies that for the current coding unit, the subblock transform includes a transform unit of ¼ size of the current coding unit. cu_sbt_quad_flag equal to 0 specifies that for the current coding unit the subblock transform includes a transform unit of ½ size of the current coding unit.

When cu_sbt_quad_flag is not present, its value is inferred to be equal to 0.

cu_sbt_horizontal_flag equal to 1 specifies that the current coding unit is split horizontally into 2 transform units. cu_sbt_horizontal_flag[x0][y0] equal to 0 specifies that the current coding unit is split vertically into 2 transform units. When cu_sbt_horizontal_flag is not present, its value is derived as follows:

If cu_sbt_quad_flag is equal to 1, cu_sbt_horizontal_flag is set to be equal to allowSbtHorQ.

Otherwise (cu_sbt_quad_flag is equal to 0), cu_sbt_horizontal_flag is set to be equal to allowSbtHorH.

cu_sbt_pos_flag equal to 1 specifies that the tu_cbf_luma, tu_cbf_cb and tu_cbf_cr of the first transform unit in the current coding unit are not present in the bitstream. cu_sbt_pos_flag equal to 0 specifies that the tu_cbf_luma, tu_cbf_cb and tu_cbf_cr of the second transform unit in the current coding unit are not present in the bitstream.

The variable SbtNumFourthsTb0 is derived as follows:

$$sbtMinNumFourths = cu\_sbt\_quad\_flag?1:2 \quad (7\text{-}117)$$

$$SbtNumFourthsTb0 = cu\_sbt\_pos\_flag?(4 - sbtMinNumFourths):sbtMinNumFourths \quad (7\text{-}118)$$

sps_sbt_max_size_64_flag equal to 0 specifies that the maximum CU width and height for allowing subblock transform is 32 luma samples. sps_sbt_max_size_64_flag equal to 1 specifies that the maximum CU width and height for allowing subblock transform is 64 luma samples.

$$MaxSbtSize = sps\_sbt\_max\_size\_64\_flag?64:32 \quad (7\text{-}33)$$

2.3.4. Quantized Residual Domain Block Differential Pulse-Code Modulation Coding (BDPCM((QR-BDPCM)

In some embodiments, quantized residual domain BDPCM (denote as QR-BDPCM hereinafter) is proposed. Different from BDPCM, the intra prediction is done on the entire block by sample copying in prediction direction (horizontal or vertical prediction) similar to intra prediction. The residual is quantized and the delta between the quantized residual and its predictor (horizontal or vertical) quantized value is coded.

For a block of size M (rows)×N (cols), let $r_{i,j}$, $0 \leq i \leq M-1$, $0 \leq j \leq N-1$ be the prediction residual after performing intra prediction horizontally (copying left neighbor pixel value across the predicted block line by line) or vertically (copying top neighbor line to each line in the predicted block) using unfiltered samples from above or left block boundary samples. Let Q $(r_{i,j})$, $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signaled:

$$\tilde{r}_{i,j} = \begin{cases} Q(r_{i,j}), & i = 0, \ 0 \leq j \leq (N-1) \\ Q(r_{i,j}) - Q(r_{(i-1),j}), & 1 \leq i \leq (M-1), \ 0 \leq j \leq (N-1) \end{cases}.$$

For horizontal prediction, similar rules apply, and the residual quantized samples are obtained by $$\tilde{r}_{i,j} = \begin{cases} Q(r_{i,j}), & 0 \leq i \leq (M-1), \ j = 0 \\ Q(r_{i,j}) - Q(r_{i,(j-1)}), & 0 \leq i \leq (M-1), \ 1 \leq j \leq (N-1) \end{cases}.$$

The residual quantized samples $\tilde{r}_{i,j}$ are sent to the decoder. On the decoder side, the above calculations are reversed to produce $Q(r_{i,j})$, $0 \leq i \leq M-1$, $0 \leq j \leq N-1$. For vertical prediction case, $$Q(r_{i,j}) \Sigma_{k=0}^{i} \tilde{r}_{k,j}, 0 \leq i \leq (M-1), 0 \leq j \leq (N-1).$$

For horizontal case, $$Q(r_{i,j}) \Sigma_{k=0}^{j} \tilde{r}_{i,k}, 0 \leq i \leq (M-1), 0 \leq j \leq (N-1).$$

The invert quantized residuals, $Q^{-1}$ $(Q(r_{i,j}))$, are added to the intra block prediction values to produce the reconstructed sample values.

Transform skip is always used in the QR-BDPCM.

2.4. Entropy Coding of Coefficients

2.4.1. Coefficients Coding of Transform-Applied Blocks

In HEVC, transform coefficients of a coding block are coded using non-overlapped coefficient groups (CG, or subblocks), and each CG contains the coefficients of a 4×4 block of a coding block. The CGs inside a coding block, and the transform coefficients within a CG, are coded according to pre-defined scan orders.

Figure 17:
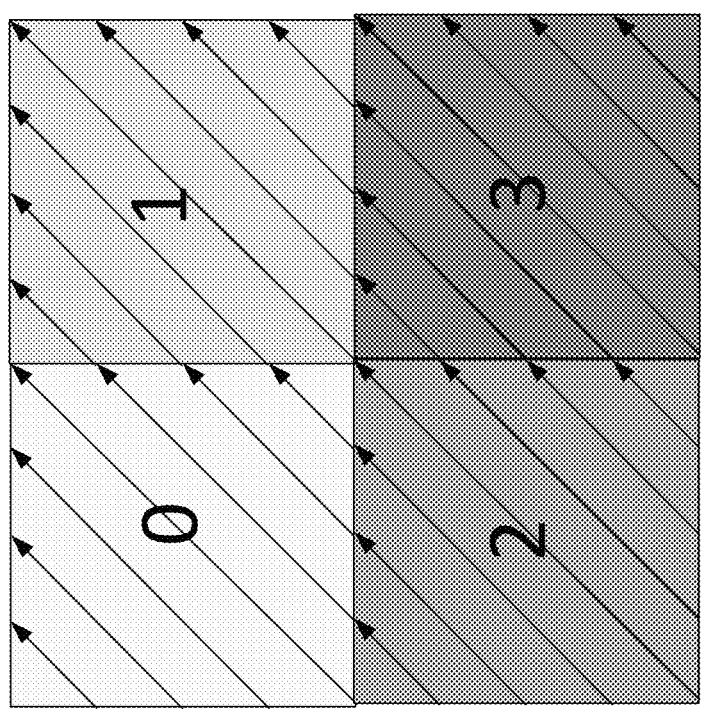
FIG. 17 shows another example of a scanning order.

The CGs inside a coding block, and the transform coefficients within a CG, are coded according to pre-defined scan orders. Both CG and coefficients within a CG follows the diagonal up-right scan order. An example for 4×4 block and 8×8 scanning order is depicted in FIG. 16 and FIG. 17, respectively.

Note that the coding order is the reversed scanning order (e.g., decoding from CG3 to CG0 in FIG. 17), when decoding one block, the last non-zero coefficient's coordinate is firstly decoded.

The coding of transform coefficient levels of a CG with at least one non-zero transform coefficient may be separated into multiple scan passes. In the VVC3, for each CG, the regular coded bins and the bypass coded bins are separated in coding order; first all regular coded bins for a subblock are transmitted and, thereafter, the bypass coded bins are transmitted. The transform coefficient levels of a subblock are coded in five passes over the scan positions as follows:

Pass 1: coding of significance (sig_flag), greater 1 flag (gt1_flag), parity (par_level_flag) and greater 2 flags (gt2_flag) is processed in coding order. If sig_flag is equal to 1, first the gt1_flag is coded (which specifies whether the absolute level is greater than 1). If gt1_flag is equal to 1, the par_flag is additionally coded (it specifies the parity of the absolute level minus 2).

Pass 2: coding of remaining absolute level (remainder) is processed for all scan positions with gt2_flag equal to 1 or gt1_flag equal to 1. The non-binary syntax element is binarized with Golomb-Rice code and the resulting bins are coded in the bypass mode of the arithmetic coding engine.

Pass 3: absolute level (absLevel) of the coefficients for which no sig_flag is coded in the first pass (due to reaching the limit of regular-coded bins) are completely coded in the bypass mode of the arithmetic coding engine using a Golomb-Rice code.

Pass 4: coding of the signs (sign_flag) for all scan positions with sig_coeff_flag equal to 1. It is guaranteed that no more than 32 regular-coded bins (sig_flag, par_flag, gt1_flag and gt2_flag) are encoded or decoded for a 4×4 subblock. For 2×2 chroma subblocks, the number of regular-coded bins is limited to 8.

The Rice parameter (ricePar) for coding the non-binary syntax element remainder (in Pass 3) is derived similar to HEVC. At the start of each subblock, ricePar is set equal to 0. After coding a syntax element remainder, the Rice parameter is modified according to predefined equation. For coding the non-binary syntax element absLevel (in Pass 4), the sum of absolute values sumAbs in a local template is determined. The variables ricePar and posZero are determined based on dependent quantization and sumAbs by a table look-up. The intermediate variable codeValue is derived as follows:

If absLevel[k] is equal to 0, codeValue is set equal to posZero;

Otherwise, if absLevel[k] is less than or equal to posZero, codeValue is set equal to absLevel[k]−1;

Otherwise (absLevel[k] is greater than posZero), codeValue is set equal to absLevel[k].

The value of codeValue is coded using a Golomb-Rice code with Rice parameter ricePar.

2.4.1.1. Context Modeling for Coefficient Coding

Figure 18:
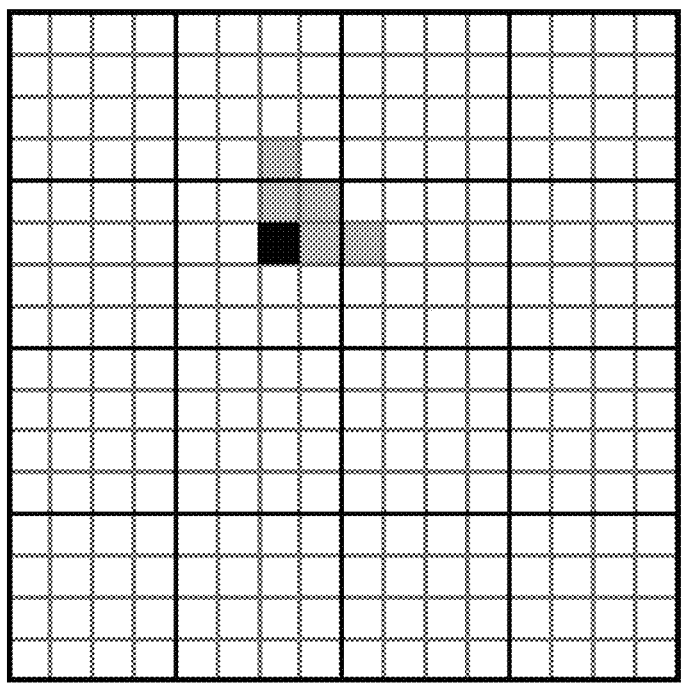
FIG. 18 shows an example template used for selecting a probability model.

The selection of probability models for the syntax elements related to absolute values of transform coefficient levels depends on the values of the absolute levels or partially reconstructed absolute levels in a local neighbourhood. The template used is illustrated in FIG. 18.

The selected probability models depend on the sum of the absolute levels (or partially reconstructed absolute levels) in a local neighbourhood and the number of absolute levels greater than 0 (given by the number of sig_coeff_flags equal to 1) in the local neighbourhood. The context modelling and binarization depends on the following measures for the local neighbourhood:

numSig: the number of non-zero levels in the local neighbourhood, sumAbs1: the sum of partially reconstructed absolute levels (absLevel1) after the first pass in the local neighbourhood, sumAbs: the sum of reconstructed absolute levels in the local neighbourhood, and diagonal position (d): the sum of the horizontal and vertical coordinates of a current scan position inside the transform block.

Based on the values of numSig, sumAbs1, and d, the probability models for coding sig_flag, par_flag, gt1_flag, and gt2_flag are selected. The Rice parameter for binarizing abs_remainder is selected based on the values of sumAbs and numSig.

2.4.1.2. Dependent Quantization (DQ)

In addition, the same HEVC scalar quantization is used with a new concept called dependent scale quantization. Dependent scalar quantization refers to an approach in which the set of admissible reconstruction values for a transform coefficient depends on the values of the transform coefficient levels that precede the current transform coefficient level in reconstruction order. The main effect of this approach is that, in comparison to conventional independent scalar quantization as used in HEVC, the admissible reconstruction vectors are packed denser in the N-dimensional vector space (N represents the number of transform coefficients in a transform block). That means, for a given average number of admissible reconstruction vectors per N-dimensional unit volume, the average distortion between an input vector and the closest reconstruction vector is reduced. The approach of dependent scalar quantization is realized by: (a) defining two scalar quantizers with different reconstruction levels and (b) defining a process for switching between the two scalar quantizers.

Figure 19:
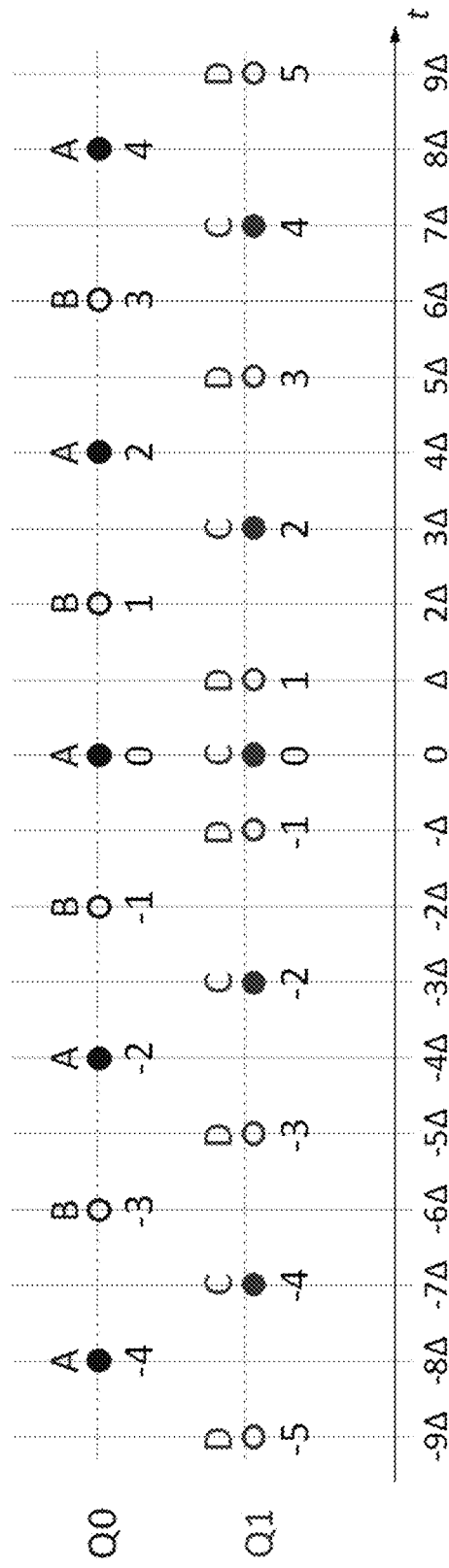
FIG. 19 shows examples of scalar quantizers.

The two scalar quantizers used, denoted by Q0 and Q1, are illustrated in FIG. 19. The location of the available reconstruction levels is uniquely specified by a quantization step size Δ. The scalar quantizer used (Q0 or Q1) is not explicitly signaled in the bitstream. Instead, the quantizer used for a current transform coefficient is determined by the parities of the transform coefficient levels that precede the current transform coefficient in coding/reconstruction order.

Figure 20:
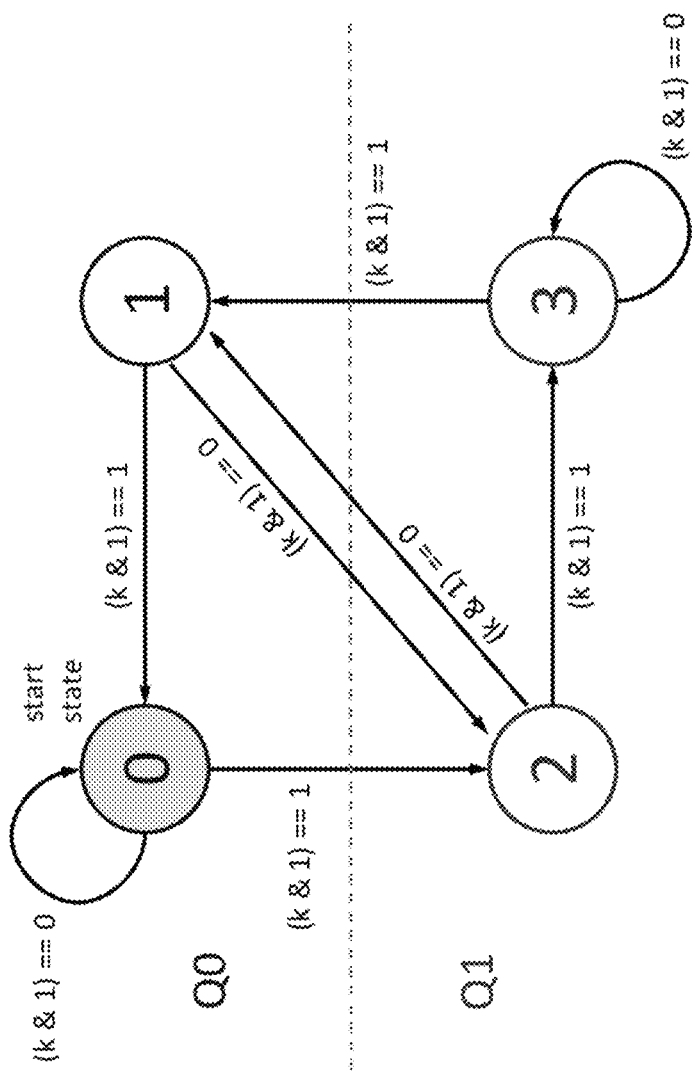
FIG. 20 shows an example of a state transition machine associated with scalar quantizers.

As illustrated in FIG. 20, the switching between the two scalar quantizers (Q0 and Q1) is realized via a state machine with four states. The state can take four different values: 0, 1, 2, 3. It is uniquely determined by the parities of the transform coefficient levels preceding the current transform coefficient in coding/reconstruction order. At the start of the inverse quantization for a transform block, the state is set equal to 0. The transform coefficients are reconstructed in scanning order (e.g., in the same order they are entropy decoded). After a current transform coefficient is reconstructed, the state is updated as shown in FIG. 20, where k denotes the value of the transform coefficient level.

2.4.1.3. Syntax and Semantics

The portions below present the syntax design for residual (transform coefficients) coding.

7.3.7.11 Residual Coding Syntax

| | Descriptor |
|---|---|
| residual_coding( x0, y0, log2TbWidth, log2TbHeight, cIdx ) { | |
|   if( ( tu_mts_idx[ x0 ][ y0 ] > 0 \|\| | |
|      ( cu_sbt_flag && log2TbWidth < 6 && log2TbHeight < 6 ) ) | |
|       && cIdx = = 0 && log2TbWidth > 4 ) | |
|     log2TbWidth = 4 | |
|   else | |
|     log2TbWidth = Min( log2TbWidth, 5 ) | |
|   if( tu_mts_idx[ x0 ][ y0 ] > 0 \|\| | |
|      ( cu_sbt_flag && log2TbWidth < 6 && log2TbHeight < 6 ) ) | |
|       && cIdx = = 0 && log2TbHeight > 4 ) | |
|     log2TbHeight = 4 | |
|   else | |
|     log2TbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2SbW = ( Min( log2TbWidth, log2TbHeight ) < 2 ? 1 : 2 ) | |
|   log2SbH = log2SbW | |
|   if ( log2TbWidth < 2 && cIdx = = 0 ) { | |
|     log2SbW = log2TbWidth | |
|     log2SbH = 4 − log2SbW | |
|   } else if ( log2TbHeight < 2 && cIdx = = 0 ) { | |
|     log2SbH = log2TbHeight | |
|     log2SbW = 4 − log2SbH | |
|   } | |
|   numSbCoeff = 1 << ( log2SbW + log2SbH ) | |
|   lastScanPos = numSbCoeff | |
|   lastSubBlock = ( 1 << ( log2TbWidth + log2TbHeight − ( log2SbW + log2SbH ) ) ) − 1 | |
|   do { | |
|     if( lastScanPos = = 0 ) { | |
|       lastScanPos = numSbCoeff | |
|       lastSubBlock− − | |
|     } | |
|     lastScanPos− − | |
|     xS = DiagScanOrder[ log2TbWidth − log2SbW ][ log2TbHeight − log2SbH ][ lastSubBlock ][ 0 ] | |
|     yS = DiagScanOrder[ log2TbWidth − log2SbW ][ log2TbHeight − log2SbH ][ lastSubBlock ][ 1 ] | |
|     xC = ( xS << log2SbW ) + DiagScanOrder[ log2SbW ][ log2SbH ][ lastScanPos ][ 0 ] | |
|     yC = ( yS << log2SbH ) + DiagScanOrder[ log2SbW ][ log2SbH ][ lastScanPos ][ 1 ] | |
|   } while( ( xC != LastSignificantCoeffX ) \|\| ( yC != LastSignificantCoeffY ) ) | |
|   QState = 0 | |
|   for( i = lastSubBlock; i >= 0; i− − ) { | |
|     startQStateSb = QState | |
|     xS = DiagScanOrder[ log2TbWidth − log2SbW ][ log2TbHeight − log2SbH ][ lastSubBlock ][ 0 ] | |
|     yS = DiagScanOrder[ log2TbWidth − log2SbW ][ log2TbHeight − log2SbH ][ lastSubBlock ][ 1 ] | |
|     inferSbDcSigCoeffFlag = 0 | |
|     if( ( i < lastSubBlock ) && ( i > 0 ) ) { | |
|       coded_sub_block_flag[ xS ][ yS ] | ae(v) |
|       inferSbDcSigCoeffFlag = 1 | |
|     } | |
|     firstSigScanPosSb = numSbCoeff | |
|     lastSigScanPosSb = −1 | |
|     remBinsPass1 = ( ( log2SbW + log2SbH ) < 4 ? 8 : 32 ) | |
|     firstPosMode0 = ( i = = lastSubBlock ? lastScanPos : numSbCoeff − 1 ) | |
|     firstPosMode1 = −1 | |
|     for( n = firstPosMode0; n >= 0 && remBinsPass1 >= 4; n− − ) { | |
|       xC = ( xS << log2SbW ) + DiagScanOrder[ log2SbW ][ log2SbH ][ n ][ 0 ] | |
|       yC = ( yS << log2SbH ) + | |

|  | Descriptor |
|---|---|
| DiagScanOrder[ log2SbW ][ log2SbH ][ n ][ 1 ]<br>  if( coded_sub_block_flag[ xS ][ yS ] && ( n > 0 \|\|<br>!inferSbDcSigCoeffFlag ) &&<br>   ( xC != LastSignificantCoeffX \|\| yC != Last SignificantCoeffY ) ) {<br>    sig_coeff_flag[ xC ][ yC ]<br>    remBinsPass1– –<br>    if( sig_coeff_flag[ xC ][ yC ] )<br>     inferSbDcSigCoeffFlag = 0<br>  }<br>  if( sig_coeff_flag[ xC ][ yC ] ) {<br>   abs_level_gt1_flag[ n ]<br>   remBinsPass1– –<br>   if( abs_level_gt1_flag[ n ] ) {<br>    par_level_flag[ n ]<br>    remBinsPass1– –<br>    abs_level_gt3_flag[ n ]<br>    remBinsPass1– –<br>   }<br>   if( lastSigScanPosSb = = –1 )<br>    lastSigScanPosSb = n<br>   firstSigScanPosSb = n<br>  }<br>  AbsLevelPass1[ xC ][ yC ] = sig_coeff_flag[ xC ][ yC ] +<br>par_level_flag[ n ] +<br>     abs_level_gt1_flag[ n ] +<br>2 * abs_level_gt3_flag[ n ]<br>  if( dep_quant_enabled_flag )<br>   QState = QStateTransTable[ QState ][ AbsLevelPass1[ xC ][ yC ] &<br>1 ]<br>  if( remBinsPass1 < 4 )<br>   firstPosMode1 = n – 1<br>}<br> for( n = numSbCoeff – 1; n >= firstPosMode1; n– – ) {<br>  xC = ( xS << log2SbW ) +<br>DiagScanOrder[ log2SbW ][ log2SbH ][ n ][ 0 ]<br>  yC = ( yS << log2SbH ) +<br>DiagScanOrder[ log2SbW ][ log2SbH ][ n ][ 1 ]<br>  if( abs_level_gt3_flag[ n ] )<br>   abs_remainder[ n ]<br>  AbsLevel[ xC ][ yC ] = AbsLevelPass1[ xC ][ yC ]<br>+2 * abs_remainder[ n ]<br> }<br> for( n = firstPosMode1; n >= 0; n– – ) {<br>  xC = ( xS << log2SbW ) +<br>DiagScanOrder[ log2SbW ][ log2SbH ][ n ][ 0 ]<br>  yC = ( yS << log2SbH ) +<br>DiagScanOrder[ log2SbW ][ log2SbH ][ n ][ 1 ]<br>  dec_abs_level[ n ]<br>  if(AbsLevel[ xC ][ yC ] > 0 )<br>   firstSigScanPosSb = n<br>  if( dep_quant_enabled_flag )<br>   QState = QStateTransTable[ QState ][ AbsLevel[ xC ][ yC ] & 1 ]<br> }<br> if( dep_quant_enabled_flag \|\| !sign_data_hiding_enabled_flag )<br>  signHidden = 0<br> else<br>  signHidden = ( lastSigScanPosSb – firstSigScanPosSb > 3 ? 1 : 0 )<br> for( n = numSbCoeff – 1; n >= 0; n– – ) {<br>  xC = ( xS << log2SbW ) +<br>DiagScanOrder[ log2SbW ][ log2SbH ][ n ][ 0 ]<br>  yC = ( yS << log2SbH ) +<br>DiagScanOrder[ log2SbW ][ log2SbH ][ n ][ 1 ]<br>  if( ( AbsLevel[ xC ][ yC ] > 0 ) &&<br>   ( !signHidden \|\| ( n != firstSigScanPosSb ) ) )<br>   coeff_sign_flag[ n ]<br> }<br> if( dep_quant_enabled_flag ) {<br>  QState = startQStateSb<br>  for( n = numSbCoeff – 1; n >= 0; n– – ) {<br>   xC = ( xS << log2SbW ) +<br>DiagScanOrder[ log2SbW ][ log2SbH ][ n ][ 0 ]<br>   yC = ( yS << log2SbH ) +<br>DiagScanOrder[ log2SbW ][ log2SbH ][ n ][ 1 ]<br>   if( AbsLevel[ xC ][ yC ] > 0 )<br>    TransCoeffLevel[ x0 ][ y0 ][ cIdx ][ xC ][ yC ] =<br>     ( 2 * AbsLevel[ xC ][ yC ] – ( QState > 1 ? 1 : 0 ) ) *<br>     ( 1 – 2 * coeff_sign_flag[ n ] ) | ae(v)<br><br><br><br>ae(v)<br><br><br>ae(v)<br><br>ae(v)<br><br><br><br><br><br><br><br><br><br><br><br><br><br><br>ae(v)<br><br><br><br><br><br><br><br>ae(v)<br><br><br><br><br><br><br><br><br><br>ae(v) |

| | Descriptor |
|---|---|
| ```
            QState = QStateTransTable[ QState ][ par_level_flag[ n ] ]
         } else {
            sumAbsLevel = 0
            for( n = numSbCoeff − 1; n >= 0; n− − ) {
               xC = ( xS << log2SbW ) +
DiagScanOrder[ log2SbW ][ log2SbH ][ n ][ 0 ]
               yC = ( yS << log2SbH ) +
DiagScanOrder[ log2SbW ][ log2SbH ][ n ][ 1 ]
               if( AbsLevel[ xC ][ yC ] > 0 ) {
                  TransCoeffLevel[ x0 ][ y0 ][ cIdx ][ xC ][ yC ] =
                     AbsLevel[ xC ][ yC ] * ( 1 − 2 * coeff_sign_flag[ n ] )
                  if( signHidden ) {
                     sumAbsLevel += AbsLevel[ xC ][ yC ]
                     if( ( n = = firstSigScanPosSb ) && ( sumAbsLevel % 2 ) = =
1 ) )
                        TransCoeffLevel[ x0 ][ y0 ][ cIdx ][ xC ][ yC ] =
                           −TransCoeffLevel[ x0 ][ y0 ][ cIdx ][ xC ][ yC ]
                  }
               }
            }
         }
      }
   }
}
``` | |

2.4.2. Coefficients Coding of TS-Coded Blocks and QR-BDPCM Coded Blocks

2.4.2.1. Coding Passes

A modified transform coefficient level coding for the TS residual. Multiple passes are applied to code each CG if it contains non-zero coefficients:

$1^{st}$ pass: code the greater than 0 flag (sig_coeff_flag), sign flag (coeff_sign_flag), greater than 1 (abs_level_gtx_flag[0]), and parity flag (par_level_flag), if needed;

$2^{nd}$-$5^{th}$ passes: For the j-th pass, code the greater than (2*j) flag (abs_level_gtx_flag[j−1]);

$6^{th}$ pass: code the remaining part of the magnitude of the coefficient (abs_remainder)

2.4.2.2. Summary of Changes Compared to Non-TS Residual Coding

Relative to the regular residual coding case, the residual coding for TS includes the following changes:

(1) no signaling of the last x/y position;
(2) coded_sub_block_flag coded for every subblock except for the last subblock when all previous flags are equal to 0;
(3) sig_coeff_flag context modelling with reduced template;
(4) a single context model for abs_level_gtX_flag[0] and par_level_flag;
(5) context modeling for the sign flag, additional greater than 5, 7, 9 flags;
(6) modified Rice parameter derivation for the remainder binarization;
(7) a limit for the number of context coded bins per sample, 2 bins per sample within one block.

2.4.2.3. Syntax and Semantics

The portions below in bold and underlines indicate proposed modifications to the standard.

7.3.6.10 Transform Unit Syntax

| | Descriptor |
|---|---|
| ```
transform_unit( x0, y0, tbWidth, tbHeight, treeType, subTuIndex ) {
   ...
   if( tu_cbf_luma[ x0 ][ y0 ] && treeType != DUAL_TREE_CHROMA
      && ( tbWidth <= 32 ) && ( tbHeight <= 32 )
      && ( IntraSubPartitionsSplit[ x0 ][ y0 ] = = ISP_NO_SPLIT )
&& ( !cu_sbt_flag ) ) {
      if( transform_skip_enabled_flag && tbWidth <= MaxTsSize && tbHeight
<= MaxTsSize )
``` | |
|       transform_skip _flag[ x0 ][ y0 ] | ae(v) |
| ```
      if( ( ( CuPredMode[ x0 ][ y0 ] != MODE_INTRA &&
sps_explicit_mts_inter_enabled_flag )
         | | ( CuPredMode[ x0 ][ y0 ] = = MODE_INTRA &&
sps_explicit_mts_intra_enabled_flag ))
         && ( tbWidth <= 32 ) && ( tbHeight <= 32 ) &&
( !transform_skip_flag[ x0 ][ y0 ] ) )
``` | |
|       tu_mts_idx[ x0 ][ y0 ] | ae(v) |
| ```
   }
   if( tu_cbf_luma[ x0 ][ y0 ] ) {
``` | |
|     if( !transform skip flag[ x0 ][ y0 ] ) | |
|       residual_coding( x0, y0, Log2( tbWidth ), Log2( tbHeight ), 0 ) | |
|     else | |
|       residual coding ts( x0, y0, Log2( tbWidth ), Log2( tbHeight ), 0 ) | |
| ```
   }
   if( tu_cbf_cb[ x0 ][ y0 ] )
      residual_coding( xC, yC, Log2( wC ), Log2( hC ), 1 )
``` | |

|  | Descriptor |
|---|---|
| ``` 
    if( tu_cbf_cr[ x0 ][ y0 ] )
      residual_coding( xC, yC, Log2( wC ), Log2( hC ), 2 )
}
``` | |

|  | Descriptor |
|---|---|
| ```
residual_ts_coding( x0, y0, log2TbWidth, log2TbHeight, cIdx ) {
  log2SbSize = ( Min( log2TbWidth, log2TbHeight ) < 2 ? 1 : 2 )
  numSbCoeff = 1 << ( log2SbSize << 1 )
  lastSubBlock = ( 1 << ( log2TbWidth + log2TbHeight − 2 * log2SbSize ) ) − 1
  /* Loop over subblocks from top-left (DC) subblock to the last one */
  inferSbCbf = 1
  MaxCcbs = 2 * ( 1 << log2TbWidth ) * ( 1<< log2TbHeight )
  for( i =0; i <= lastSubBlock; i++ ) {
    xS = DiagScanOrder[ log2TbWidth − log2SbSize ][ log2TbHeight − log2SbSize ][ i ][ 0 ]
    yS = DiagScanOrder[ log2TbWidth − log2SbSize ][ log2TbHeight − log2SbSize ][ i ][ 1 ]
    if( ( i != lastSubBlock | | !inferSbCbf )
``` | |
|       coded_sub_block_flag[ xS ][ yS ] | ae(v) |
| ```
      MaxCcbs− −
      if( coded_sub_block_flag[ xS ][ yS ] && i < lastSubBlock )
        inferSbCbf = 0
    }
    /* First scan pass */
    inferSbSigCoeffFlag = 1
    for( n = ( i == 0; n <= numSbCoeff − 1; n++ ) {
      xC = ( xS << log2SbSize ) + DiagScanOrder[ log2SbSize ][ log2SbSize ][ n ][ 0 ]
      yC = ( yS << log2SbSize ) + DiagScanOrder[ log2SbSize ][ log2SbSize ][ n ][ 1 ]
      if( coded_sub_block_flag[ xS ][ yS ] &&
        ( n == numSbCoeff − 1 | | !inferSbSigCoeffFlag ) ) {
``` | |
|       sig_coeff_flag[ xC ][ yC ] | ae(v) |
| ```
        MaxCcbs− −
        if( sig_coeff_flag[ xC ][ yC ] )
          inferSbSigCoeffFlag = 0
      }
      if( sig_coeff_flag[ xC ][ yC ] ) {
``` | |
|       coeff_sign_flag[ n ] | ae(v) |
|       abs_level_gtx_flag[ n ][ 0 ] | ae(v) |
| ```
        MaxCcbs = MaxCcbs − 2
        if( abs_level_gtx_flag[ n ][ 0 ] ) {
``` | |
|       par_level_flag[ n ] | ae(v) |
| ```
          MaxCcbs− −
        }
      }
      AbsLevelPassX[ xC ][ yC ] =
        sig_coeff_flag[ xC ][ yC ] + par_level_flag[ n ] + abs_level_gtx_flag[ n ][ 0 ]
    }
    /* Greater than X scan passes (numGtXFlags=5) */
    for( i = 1; i <= 5 − 1 && abs_level_gtx_flag[ n ][ i − 1 ] ; i++ ) {
      for( n = 0; n <= numSbCoeff − 1; n++ ) {
        xC = ( xS << log2SbSize ) + DiagScanOrder[ log2SbSize ][ log2SbSize ][ n ][ 0 ]
        yC = ( yS << log2SbSize ) + DiagScanOrder[ log2SbSize ][ log2SbSize ][ n ][ 1 ]
``` | |
|       abs_level_gtx _flag[ n ][ i ] | ae(v) |
| ```
        MaxCcbs− −
        AbsLevelPassX[ xC ][ yC ] += 2 * abs_level_gtx_flag[ n ][ i ]
      }
    }
    /* remainder scan pass */
    for( n = 0; n <= numSbCoeff − 1; n++ ) {
      xC = ( xS << log2SbSize ) + DiagScanOrder[ log2SbSize ][ log2SbSize ][ n ][ 0 ]
      yC = ( yS << log2SbSize ) + DiagScanOrder[ log2SbSize ][ log2SbSize ][ n ][ 1 ]
      if( abs_level_gtx_flag[ n ][ numGtXFlags − 1 ] )
``` | |
|       abs_remainder[ n ] | ae(v) |
|       TransCoeffLevel[ x0 ][ y0 ][ cIdx ][ xC ][ yC ] = ( 1 − 2 * | |

-continued

| | Descriptor |
|---|---|
| coeff_sign_flag[ n ] ) * <br> ( AbsLevelPassX[ xC ][ yC ] + abs_remainder[ n ] ) <br> } <br> } <br> } | |

The number of context coded bins is restricted to be no larger than 2 bins per sample for each CG.

TABLE 8

Assignment of ctxInc to syntax elements with context coded bins

| Syntax element | binIdx | | | | | |
|---|---|---|---|---|---|---|
| | 0 | 1 | 2 | 3 | 4 | >=5 |
| last_sig_coeff_x_prefix | | 0 . . . 23 (clause 9.5.4.2.4) | | | | |
| last_sig_coeff_y_prefix | | 0 . . . 23 (clause 9.5.4.2.4) | | | | |
| last_sig_coeff_x_suffix | bypass | bypass | bypass | bypass | bypass | bypass |
| last_sig_coeff_y_suffix | bypass | bypass | bypass | bypass | bypass | bypass |
| coded_sub_block_flag [ ][ ] | ( MaxCcbs > 0) ? <br> ( 0..7 <br> (clause 9.5.4.2.6) ) : <br> bypass | na | na | na | na | na |
| sig_coeff_flag[ ][ ] | ( MaxCcbs > 0) ? <br> ( 0..93 <br> (clause 9.5.4.2.8) ) : <br> bypass | na | na | na | na | na |
| par_level_flag[ ] | ( MaxCcbs > 0) ? <br> ( 0..33 <br> (clause 9.5.4.2.9) ) : <br> bypass | na | na | na | na | na |
| abs_level_gtx_flag[ ][ i ] | 0..70 <br> (clause 9.5.4.2.9) | na | na | na | na | na |
| abs_remainder[ ] | bypass | bypass | bypass | bypass | bypass | bypass |
| dec_abs_level[ ] | bypass | bypass | bypass | bypass | bypass | bypass |
| coeff_sign_flag[ ] | bypass | na | na | na | na | na |
| transform skip flag[ x0 ][ y0 ] = = 0 | | | | | | |
| coeff sign flag[ ] <br> transform skip flag[ x0 ][ y0 ] = = 1 | <u>0</u> | <u>na</u> | <u>na</u> | <u>na</u> | <u>na</u> | <u>na</u> |

2.4.2.4. Context Modeling

The context modeling is defined as follows:
coded_sub_block_flag: two neighboring CGs, above and left (instead of right and below)

3. Drawbacks of Existing Implementations

The current design has the following problems:

1. To meet the throughput associated with context-adaptive binary arithmetic coding (CABAC), the maximum number of context coded bins per block/per sample is set and a counter is used to record how many context coded bins are included within one block. Accordingly, the first few CGs (from top-left to bottom-right) may be efficiently coded with contexts, while the last several CGs which typically have higher energy (larger prediction errors) may be coded with bypass mode. Therefore, the performance might be sub-optimal.

2. For coefficients in some CGs, the bypass coding mode may be applied. However, it still may include transmitting several syntax elements, which may be less efficient.

4. Example Techniques and Embodiments

The detailed embodiments described below should be considered as examples to explain general concepts. These embodiments should not be interpreted narrowly way. Furthermore, these embodiments can be combined in any manner.

1. Instead of adding the constraint of maximum number of context coded bins per coding block or transform block, it is proposed to add a constraint of maximum number of coded bins per coding group (CG).
   a. In one example, a counter is used to record the number of context coded bins per CG.
      i. Alternatively, furthermore, the counter is reset to 0 when encoding/decoding a new CG.
      ii. In one example, if the counter is equal or larger than the maximum number, all the bins not yet coded/parsed in the CG will be coded/parsed with bypass coding/parsing.
   b. In one example, the maximum number context of coded bins for different CGs may be different.
   c. In one example, the maximum number of context coded bins per CG may depend on the location of the CG relative to the whole block.
2. Maximum number of context coded bins (denoted as maxCbinB) may be controlled in two steps. First, which CGs contains non-zero coefficients (e.g., coded_sub_block_flag) may be signaled. Second, non-zero CGs are signaled and maximum number of context coded bins (denoted as maxCbinCG) may be constrained for each non-zero CG.
   a. In one example, suppose N context coded bins are used for coding coded_sub_block_flag of CGs which may signal sub_block flags and there are K non-zero CGs, maxCbinCG may be set equal to floor (maxCbinB−N)/K.
      i. Division here may be implemented by a look-up table.
   b. In one example, maxCbinCG may be different for different CGs. E.g., maxCbinCG may increase as CG number increases.
3. Instead of adding the constraint of maximum number of context coded bins per coding block or transform block, it is proposed to add constraints on maximum number of coded bins per syntax element or per coding pass.
   a. In one example, multiple variables may be allocated.
      i. In one example, one variable may be corresponding to a counter used to record the number of context coded bins for the specific syntax element/coding pass.
      ii. Alternatively, furthermore, the counter may be reset to 0 when encoding/decoding a block.
      iii. In one example, if the counter is equal or larger than the maximum number, all the bins not yet coded/parsed in the syntax element or coding pass will be coded/parsed with bypass coding/parsing.
   b. In one example, the maximum values for different syntax element/coding pass may be different.
   c. In one example, the maximum number of context coded bins per syntax element may depend on the syntax element.
   d. In one example, the maximum number context of coded bins per coding pass may depend on the coding pass.
4. Multiple sets of residual coding methods (e.g., different syntax elements, different binarization methods, number of coding passes) may be utilized for coding one block, and the switch among different methods may depend on the number of context coded bins. Denote the max context coded bins per unit (e.g., coding unit/transform unit/coding group) by MaxCcBins.
   a. In one example, when the number of context coded bins per unit is no larger than (MaxCcBins−TH1) after coding a first syntax element (e.g., a sign flag such as coeff_sign_flag), the current design may be utilized. Otherwise, different coding methods may be applied for coding the following syntax elements or next CG or next sub-region. TH1 is an integer, e.g., 1, 2, 3, 4.
   b. In one example, when the number of context coded bins per unit is no larger than the (MaxCcBins−TH1) after coding the m-th pass, the foregoing design may be utilized. Otherwise, different coding methods may be applied for coding the (m+n)-th pass or next CG or next sub-region wherein n is an integer variable. TH1 is an integer, e.g., 1, 2, 3, 4.
      i. In one example, m is set to 1, 2, 3, 4, 5.
   c. In one example, when the number of context coded bins per unit is no larger than the (MaxCcBins TH1) after coding a CG, the foregoing design may be utilized. Otherwise, different coding methods may be applied for coding the following next CG or next sub-region. TH1 is an integer, e.g., 1, 2, 3, 4.
   d. In one example, a coding method with L-passes (L!=6) may be applied.
      i. In one example, L is set to 1, 2, 3, 4, 5.
      ii. In one example, the $2^{nd}$-$5^{th}$ passes may be skipped.
      iii. In one example, the $1^{st}$-$5^{th}$ passes may be skipped.
      iv. In one example, in each pass, all the coefficients in a CG or block are scanned and/or coded if needed.
   e. In one example, a coding method with different syntax elements may be applied.
      i. In one example, the parity flag is not coded in the K-th pass. E.g. K=1.
      ii. In one example, the sign flag is not coded in the K-th pass. E.g. K=1.
      iii. In one example, the coefficient may be directly binarized and coded.
         1) Denote the value of one coefficient as x, and the value of (x>0?2x: 2x+1) or (x>=0? 2x: 2x+1) may be binarized and coded.
      iv. In one example, the magnitude of one coefficient may be directly binarized and its sign value may be further coded.
      v. In one example, run-level coding may be applied wherein 'run' indicates how many consecutive zero coefficients in a given scanning order, and 'level' indicates the magnitude of the non-zero coefficient.
   f. In one example, a coding method with different binarization method may be applied.
      i. In one example, the rice parameter and/or EG-code and/or Golomb-Rice may be derived differently for coding the remaining magnitude.
   g. In one example, TH1 in item 4a, 4b, and 4c may be a pre-defined integer value.
      i. In one example, TH1 may be zero or positive value, e.g. 0, 1, 2, 3, 4.
      ii. In one example, TH1 may be zero or negative value, e.g., 0, −1, −2, −3, −4.
      iii. In one example, TH1 may be depend on quantization parameter/coded block mode/block dimension/slice type/picture type, etc. al.
5. The above methods may be applied to TS-coded blocks.
   a. Alternatively, furthermore, they may be applied to QR-BDPCM-coded blocks.
   b. Alternatively, furthermore, they may be applied to other blocks coded without transform applied.
   c. Alternatively, furthermore, they may be applied to other blocks coded with transform applied.
   d. Alternatively, the above methods may be applied to a block with the lossless coding mode, e.g., transform and quantization process are not applied to a block.
6. Whether to enable or disable the above methods may be signaled in decoding parameter set (DPS)/SPS/picture parameter set (PPS)/adaption parameter set (APS)/video parameter set (VPS)/sequence header/picture header/slice header/tile group header/tile/group of CTUs, etc. al.
   a. Alternatively, which method to be used may be signaled in DPS/SPS/PPS/APS/VPS/sequence header/picture header/slice header/tile group header/tile/group of CTUs, etc. al.
   b. Alternatively, whether to enable or disable the above methods and/or which method to be applied may be dependent on block dimension, Virtual Pipelining Data Units (VPDU), picture type, low delay check flag.
  c. Alternatively, whether to enable or disable the above methods and/or which method to be applied may be dependent on the color component, color format, etc. al.
  d. Alternatively, whether to enable or disable the above methods and/or which method to be applied may be dependent on whether QR-BDPCM or TS is applied.
7. In one example, the maximum number of context coded bins per block or per CG or per coding per or per syntax element may depend on the color component.
8. In one example, the maximum number of context coded bins per block or per CG or per coding per or per syntax element may depend on the slice/tile/tile group/picture type.
9. In one example, the maximum number of context coded bins per block or per CG or per coding per or per syntax element may be different for different profiles/levels/tiers in a standard.
10. In one example, the maximum number of context coded bins per block or per CG or per coding per or per syntax element may be signaled in a video unit, such as in DPS/SPS/PPS/APS/VPS/sequence header/picture header/slice header/tile group header/tile/group of CTUs, etc. al.
11. In one example, the maximum number of context coded bins per block (such as per CTU or CU or TU or CG) may depend on the dimensions of the block (such as the width and/or height of a CTU or CU or TU or CG).
  a. Alternatively, furthermore, the maximum number of context coded bins per block (such as per CTU or CU or TU or CG) may depend on resolution of the picture, such as the width and/or height of the picture.

5. Example Implementations of the Disclosed Embodiments

Figure 21:
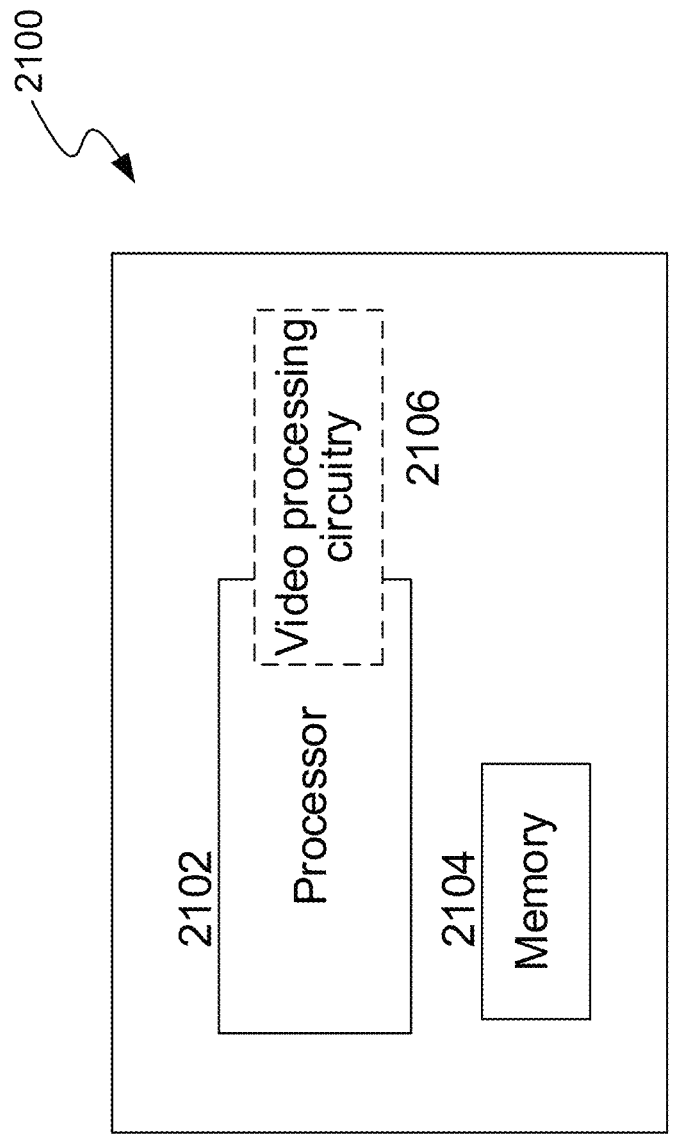
FIG. 21 is a block diagram of an example of a hardware platform for implementing a visual media decoding or a visual media encoding technique according to various embodiments of the disclosure.

FIG. 21 is a block diagram of a video processing apparatus 2100. The apparatus 2100 may be used to implement one or more of the methods described herein. The apparatus 2100 may be embodied in a smartphone, tablet, computer, Internet of Things (IoT) receiver, and so on. The apparatus 2100 may include one or more processors 2102, one or more memories 2104 and video processing hardware 2106. The processor(s) 2102 may be configured to implement one or more methods described in the present document. The memory (memories) 2104 may be used for storing data and code used for implementing the methods and techniques described herein. The video processing hardware 2106 may be used to implement, in hardware circuitry, some techniques described in the present document, and may be partly or completely be a part of the processors 2102 (e.g., graphics processor core (GPU) or other signal processing circuitry).

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a video block may be encoded in terms of transformed and coded error residual values and also using bits in headers and other fields in the bitstream. Here, the video block may be a logical unit corresponding to the processing operation being performed, e.g., a coding unit, a transform unit, a prediction unit, and so on.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

FIG. 22 is a flowchart for an example method 2200 of visual media processing. The method 2200 includes, at 2210, performing a conversion between a current video unit and a bitstream representation of the current video unit, wherein the conversion includes context modeling of the current video unit based on applying a constraint on a maximum number of context coded bins per coding group (CG) associated with the current video unit, wherein information of the context modeling is included in the bitstream representation of the current video unit.

Some embodiments may be described using the following clause-based format.

1. A method of visual media processing, comprising:
performing a conversion between a current video unit and a bitstream representation of the current video unit, wherein the conversion includes context modeling of the current video unit based on applying a constraint on a maximum number of context coded bins per coding group (CG) associated with the current video unit, wherein information of the context modeling is included in the bitstream representation of the current video unit.

2. The method of clause 1, wherein a counter is used to record a number of context coded bins per CG.

3. The method of clause 2, wherein the counter is reset to zero when encoding or decoding a new CG.

4. The method of clause 2, further comprising:
upon determining that a value of the counter is greater than the maximum number of context coded bins per CG, applying a bypass coding step to one or more uncoded context coded bins.

5. The method of clause 1, wherein the maximum number of context coded bins per CG is different for different coding groups (CGs).

6. The method of clause 1, wherein the maximum number of context coded bins per CG is based, at least in part, on a location of a CG relative to the current video unit.

7. The method of clause 1, further comprising:
identifying one or more CGs with non-zero coefficients, wherein the constraint on the maximum number of context coded bins per coding group (CG) is applied to the one or more CGs with non-zero coefficients; and
signaling the one or more CGs with non-zero coefficients in the bitstream representation.

8. A method of visual media processing, comprising:
performing a conversion between a current video unit and a bitstream representation of the current video unit, wherein the conversion includes context modeling of the current video unit based on applying a constraint on a maximum number of context coded bins per syntax element or per coding pass associated with the current video unit, wherein information of the context modeling is included in the bitstream representation of the current video unit.

9. The method of clause 8, wherein a counter is used to record a number of context coded bins per syntax element or per coding pass.

10. The method of clause 9, wherein the counter is reset to zero when encoding or decoding a new syntax element or coding pass.

11. The method of clause 8, wherein the maximum number of context coded bins per syntax element or per coding pass is different for different syntax elements or coding passes.

12. The method of clause 8, wherein the maximum number of context coded bins per CG is based, at least in part, on a syntax element or a coding pass associated with the current video unit.

13. A method of visual media processing, comprising:

performing a conversion between a current video unit and a bitstream representation of the current video unit, wherein the conversion includes one or more residual coding steps such that each residual coding step is associated with a number of context coded bins per coding unit; and switching, during the conversion, from a first residual coding step to a second residual coding step based, at least in part, on a first number of context coded bins per coding unit in the first step and a second number of context coded bins per coding unit in the second step.

14. The method of clause 13, wherein, in the each residual coding step, a maximum number of context coded bins per coding unit is constrained to a upper limit indicated in the bitstream representation.

15. The method of clause 14, further comprising:

upon determining that the first number is less than or equal to the maximum number of context coded bins per coding unit after coding a syntax element of the current video unit, applying the first residual coding step on the current video unit; and upon determining that the first number exceeds the maximum number of context coded bins per coding unit, switching from the first residual coding step to the second residual coding step for other video units.

16. The method of clause 14, further comprising:

upon determining that the first number is less than or equal to the maximum number of context coded bins per coding unit after coding multiple passes of the current video unit, applying the first residual coding step on the current video unit; and upon determining that the first number exceeds the maximum number of context coded bins per coding unit, switching from the first residual coding step to the second residual coding step for other video units.

17. The method of clause 14, wherein the each residual coding step is associated with a syntax element.

18. The method of clause 14, wherein syntax elements of the one or more one or more residual coding steps are different from one another.

19. The method of clause 18, wherein the syntax elements include a parity flag, a sign flag, or a coded coefficient.

20. The method of clause 19, wherein a magnitude and/or a sign of the coded coefficient is expressed in a binarized form.

21. The method of clause 20, wherein the one or more residual coding steps includes a run-level coding such that a run indicates a number of consecutive zero coefficients in a scanning order and a level indicates a magnitude of a non-zero coefficient.

22. The method of clause 19, wherein the one or more residual coding steps includes a binarization process.

23. The method of clause 19, wherein the one or more residual coding steps includes a rice parameter for coding a non-binary syntax element.

24. The method of any one or more of clauses 1-23, wherein the current video unit is any one of: a TS-coded block, a QR-BDPCM-coded block, a block that lacks a transform step, a block that is associated with a transform step, or a block that is associated with a lossless coding process.

25. The method of clause 24, wherein the lossless coding process includes a lack of a transform step and/or a lack of a quantization step.

26. The method of any one or more of clauses 1-25, wherein the context modeling and/or the one or more residual coding steps is selectively enabled or disabled.

27. The method of clause 26, wherein information related to selectively enabling or disabling the context modeling and/or the one or more residual coding steps is included in the bitstream representation.

28. The method of clause 26, wherein selectively enabling or disabling the context modeling and/or the one or more residual coding steps is based, at least in part on, a condition.

29. The method of clause 28, wherein the condition is associated with any one or more of: a dimension of the current video unit, a picture type of the current video unit, a virtual pipelining data unit (VPDU) of the current video unit, or a low delay check flag of the current video unit, a color component or a color format of the current video unit, or a coding step associated with the current video unit.

30. The method of clause 29, wherein the coding step associated with the current video unit is QR-BDPCM or TS.

31. The method of any one or more of clauses 1-30, wherein the maximum number of context coded bins per CG depends on a color component of the current video unit.

32. The method of any one or more of clauses 1-30, wherein the maximum number of context coded bins per syntax element or per coding pass depends on a color component of the current video unit.

33. The method of any one or more of clauses 1-30, wherein the maximum number of context coded bins per coding unit depends on a color component of the current video unit.

34. The method of any one or more of clauses 1-30, wherein the maximum number of context coded bins per CG depends on a slice/tile/tile group/picture type associated with the current video unit.

35. The method of any one or more of clauses 1-30, wherein the maximum number of context coded bins per syntax element or per coding pass depends on a slice/tile/tile group/picture type associated with the current video unit.

36. The method of any one or more of clauses 1-30, wherein the maximum number of context coded bins per coding unit depends on a slice/tile/tile group/picture type associated with the current video unit.

37. The method of any one or more of clauses 1-30, wherein the maximum number of context coded bins per CG depends on dimensions of the current video unit or a resolution of the current video unit.

38. The method of any one or more of clauses 1-30, wherein the maximum number of context coded bins per syntax element or per coding pass depends on dimensions of the current video unit or a resolution of the current video unit.

39. The method of any one or more of clauses 1-30, wherein the maximum number of context coded bins per coding unit depends on dimensions of the current video unit or a resolution of the current video unit.

40. The method of any one or more of clauses 1-30, wherein the maximum number of context coded bins per CG depends on a profile/level/tier of the current video unit.

41. The method of any one or more of clauses 1-30, wherein the maximum number of context coded bins per syntax element or per coding pass depends on a profile/level/tier of the current video unit.

42. The method of any one or more of clauses 1-30, wherein the maximum number of context coded bins per coding unit depends on a profile/level/tier of the current video unit.

43. The method of any one or more of clauses 1-30, wherein the bitstream representation is associated with a DPS/SPS/PPS/APS/VPS/sequence header/picture header/slice header/tile group header/tile/group of coding tree units (CTUs).

44. An apparatus in a video system comprising a processor and a non-transitory memory with instructions thereon, wherein the instructions upon execution by the processor, cause the processor to implement the method in any one of clauses 1 to 42.

45. A computer program product stored on a non-transitory computer readable media, the computer program product including program code for carrying out the method in any one of clauses 1 to 42.

Figure 23:
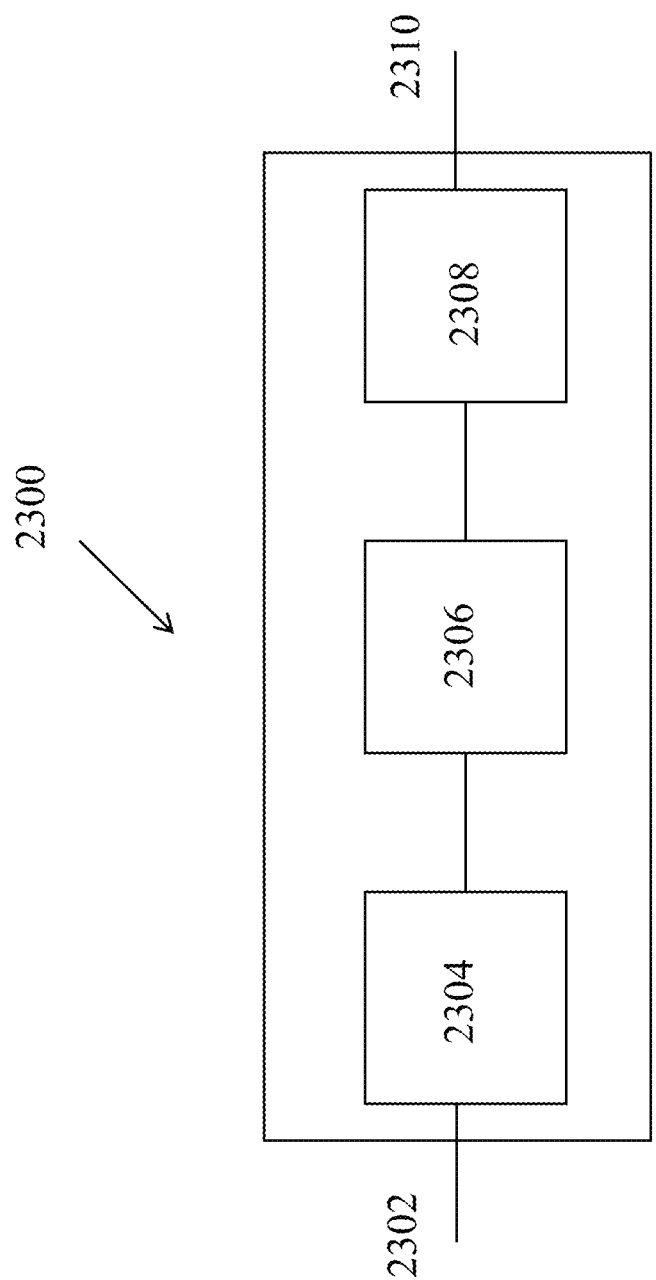
FIG. 23 is a block diagram of an example video processing system according to various embodiments of the disclosure.

FIG. 23 is a block diagram showing an example video processing system 2300 in which various techniques disclosed herein may be implemented. Various implementations may include some or all of the components of the system 2300. The system 2300 may include input 2302 for receiving video content. The video content may be received in a raw or uncompressed format, e.g., 8 or 10 bit multi-component pixel values, or may be in a compressed or encoded format. The input 2302 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2300 may include a coding component 2304 that may implement the various coding or encoding methods described in the present document. The coding component 2304 may reduce the average bitrate of video from the input 2302 to the output of the coding component 2304 to produce a coded representation of the video. The coding techniques are therefore sometimes called video compression or video transcoding techniques. The output of the coding component 2304 may be either stored, or transmitted via a communication connected, as represented by the component 2306. The stored or communicated bitstream (or coded) representation of the video received at the input 2302 may be used by the component 2308 for generating pixel values or displayable video that is sent to a display interface 2310. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 24:
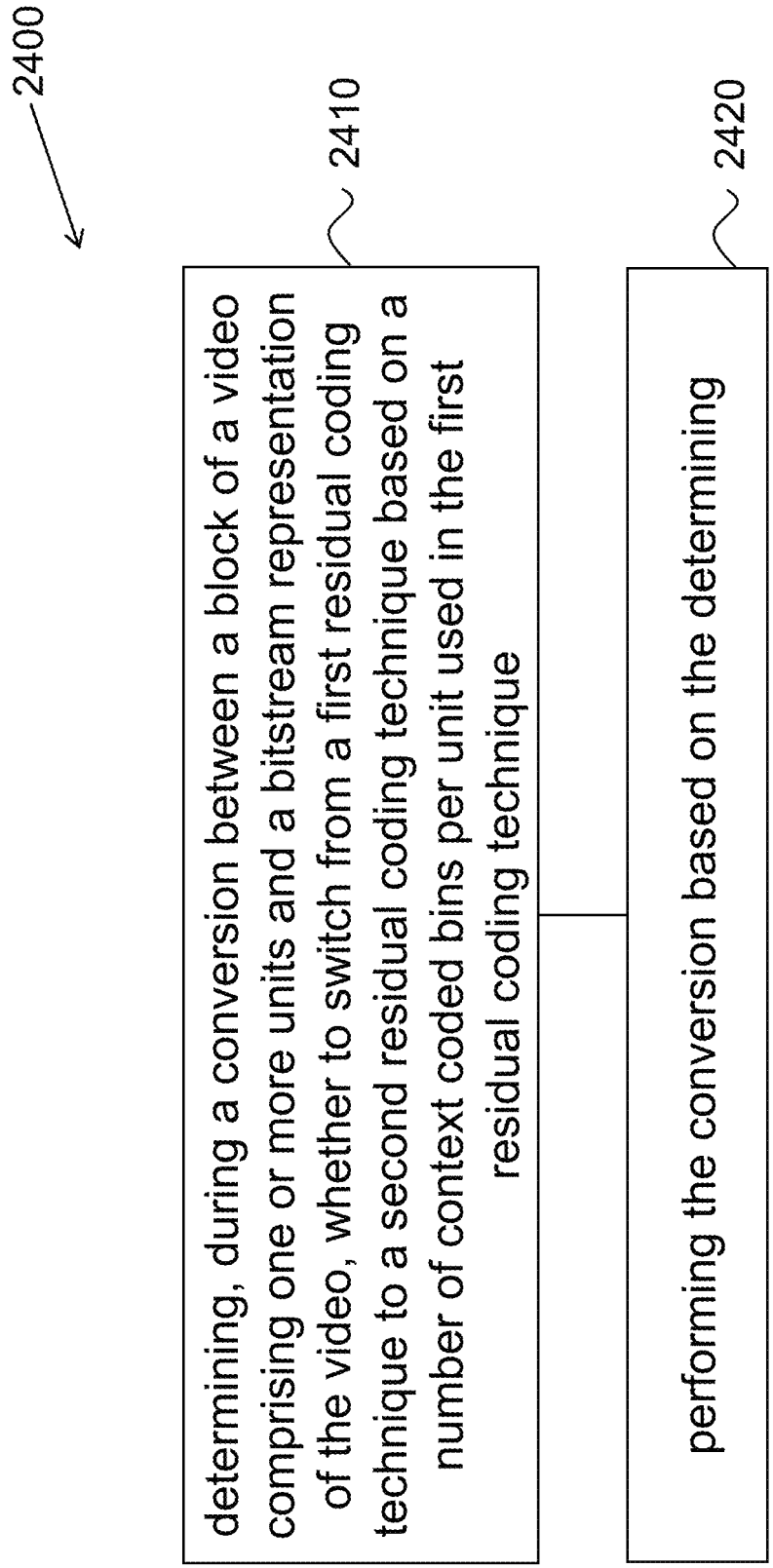
FIG. 24 shows a flowchart of an example method for video processing according to various embodiments of the disclosure.

FIG. 24 shows a flowchart of an example method 2400 for video processing in accordance with the present technology. The method 2400 includes, at operation 2410, determining, during a conversion between a block of a video comprising one or more units and a bitstream representation of the video, whether to switch from a first residual coding technique to a second residual coding technique based on a number of context coded bins per unit used in the first residual coding technique. Coefficients of the unit are coded in the bitstream representation in multiple passes using the first residual coding technique or the second residual coding technique. The method 2400 also includes, at operation 2420, performing the conversion based on the determining.

In some embodiments, the unit comprises the block, a transform block within the block, a coding group of the block, a syntax element of the block. In some embodiments, the first residual coding technique is used for an $m^{th}$ pass, m being a positive integer. In some embodiments, m is 1, 2, 3, 4, or 5. In some embodiments, there is no switch from the first residual coding technique to the second residual coding technique in case the number of context coded bins for each unit used in the first residual coding technique is equal to or smaller than a threshold. In some embodiments, a switch to the second residual coding technique occurs in an $(m+n)^{th}$ pass, a subsequent coding group, or a subsequent subregion in case the number of context coded bins for each unit used in the first residual coding technique is greater than a threshold, n being a positive integer.

In some embodiments, the first residual coding technique is used for bins that are decoded with a context coding mode and the second residual coding techniques is used for bins that are decoded with a bypass coding mode. In some embodiments, a bin is processed based on at least one context in the context coding mode and a bin is processed without using any context in the bypass coding mode.

In some embodiments, the conversion comprises processing multiple syntax elements of the block, the multiple syntax elements including at least a sign flag. In some embodiments, there is no switch from the first residual coding technique to the second residual coding technique in case the number of context coded bins for each unit used in the first residual coding technique is equal to or smaller than a threshold. In some embodiments, the second residual coding technique is used for one or more syntax elements of the multiple syntax elements, a subsequent coding group, or a subsequent subregion in case the number of context coded bins per coding unit is greater than a threshold. In some embodiments, the first residual coding technique is used to process the at least the sign flag in case the number of context coded bins for each unit used in the first residual coding technique is equal to or smaller than a threshold, and the second residual coding technique is used to process the at least the sign flag in case the number of context coded bins for each unit used in the first residual coding technique is greater than a threshold.

In some embodiments, the threshold corresponds to a maximum context coded bins per unit that is constrained to an upper limit indicated in the bitstream representation. In some embodiments, the maximum context coded bins per unit is denoted as MaxCcBins, and the threshold is (MaxCcBins−TH1), TH1 being an integer. In some embodiments, TH1 is zero or a positive integer. In some embodiments, TH1 is zero or a negative integer. In some embodiments, TH1 is based on a coding characteristic associated with the block. In some embodiments, the coding characteristic comprises at least a quantization parameter, a coded block mode, a block dimension, a slice type, or a picture type.

In some embodiments, the first residual coding technique or the second residual coding technique includes L passes, L being a positive integer not equal to 6. In some embodiments, L is 1, 2, 3, 4, or 5. In some embodiments, 2nd to 5th passes of the first residual coding technique or the second residual coding technique are skipped for coding the coefficients of the unit. In some embodiments, 1st to 5th passes of the first residual coding technique or the second residual coding technique are skipped for coding the coefficients of the unit. In some embodiments, all coefficients in the unit are scanned.

In some embodiments, the first residual coding technique or the second residual coding technique comprises processing multiple syntax elements of the block, the multiple syntax elements comprising at least one of a parity flag, a sign flag, a significant flag indicating whether a coded coefficient is zero or not, an absolute-level flag indicating whether an absolute value of a coefficient is greater than a threshold, or one or more bins of a coded coefficient. In some embodiments, the parity flag is not coded in a $k^{th}$ pass. In some embodiments, the sign flag is not coded in a $k^{th}$ pass. In some embodiments, k=1.

In some embodiments, a coefficient of the unit is binarized in the bitstream representation. In some embodiments, a value of the coefficient is denoted as x, and the coefficient is binarized as (x>0? 2x: 2x+1) or (x>=0? 2x: 2x+1) in the bitstream representation. In some embodiments, an absolute value of a coefficient of the unit is binarized in the bitstream representation and a signed value of the coefficient is coded separately in the bitstream representation. In some embodiments, the bitstream representation comprises a first indicator indicating a number of consecutive zero coefficients in a scanning order and a second indicator indicating an absolute value of a non-zero coefficient. In some embodiments, the first residual coding technique or the second residual coding technique uses different binarization techniques for coding the coefficients of the unit. In some embodiments, a parameter for coding the coefficients of the unit is derived differently for the different binarization techniques. In some embodiments, the parameter comprises a rice parameter or a Golomb-Rice code.

FIG. 25 shows a flowchart of an example method 2500 for video processing in accordance with the present technology. The method 2500 includes, at operation 2510, performing a conversion between a block of a video and a bitstream representation of the video. The block comprises one or more coding groups, and the current block is coded in the bitstream representation based on a constraint on a maximum number of context coded bins for each coding group.

In some embodiments, the method includes recording, for a coding group, a number of context coded bins using a counter. In some embodiments, the method includes resetting the counter before processing a subsequent coding group. In some embodiments, the method includes applying, in case the counter is equal to or larger than the maximum number of context coded bins for the coding group, a bypass step to one or more uncoded context coded bins in the coding group.

In some embodiments, the maximum number of context coded bins for each coding group is different for different coding groups. In some embodiments, coding groups are associated with coding group indices, and the maximum number of context coded bins for each coding group increases as a value of a corresponding coding group index increases.

In some embodiments, the maximum number of context coded bins for each coding group is based on a location of a corresponding coding group relative to the current block. In some embodiments, the bitstream representation comprises a syntax flag indicating a number of coding groups that each has at least one non-zero coefficient. The bitstream representation further includes information for the coding groups that each has at least one non-zero coefficient. The maximum number of context coded bins for each coding group is constrained for the coding groups that each has at least one non-zero coefficient. In some embodiments, N context coded bins are used for coding the syntax flag. The syntax flag indicates K coding groups that each has at least one non-zero coefficient, and the maximum number of context coded bins for each coding group is constrained based on (maxCbinB−N)/K, maxCbinB being a maximum number of context coded bins for the current block. In some embodiments, the maximum number of context coded bins for each coding group is determined using a look up table.

FIG. 26 shows a flowchart of an example method 2600 for video processing in accordance with the present technology. The method 2600 includes, at operation 2610, performing a conversion between a current block of a video and a bitstream representation of the video. The current block is coded in the bitstream representation based on a constraint on a maximum number of context coded bins for each syntax element or each coding pass associated with the current block.

In some embodiments, the method includes recording multiple counters each corresponding to a number of context coded bin used for a syntax element or a coding pass. In some embodiments, the method includes resetting the multiple counters before performing a conversion for a subsequent block of the video. In some embodiments, the method includes applying, in case a counter corresponding to a syntax element or a coding pass is equal to or larger than the maximum number of context coded bins for each syntax element or each coding pass, a bypass step to one or more uncoded context coded bins associated with the syntax element or the coding pass.

In some embodiments, the maximum number of context coded bins is different for different syntax elements or coding passes. In some embodiments, the maximum number of context coded bins for each syntax element is based on a characteristic of the syntax element. In some embodiments, the maximum number of context coded bins for each coding pass is based on a characteristic of the coding pass.

In some embodiments, the block is coded using a transform skip residual coding technique. In some embodiments, the block is coded using a quantized residual domain block differential pulse-code modulation coding technique. In some embodiments, the block is coded without any transform applied to the block. In some embodiments, the block is coded without at least one transform applied to the block. In some embodiments, the block is coded using a lossless coding technique in which no transform or quantization process is applied.

In some embodiments, the bitstream representation comprise an indicator indicating a manner in which the first residual coding technique or the second residual coding technique is applied. In some embodiments, the bitstream representation comprise an indicator indicating which of the first residual coding technique or the second residual coding technique is applied. In some embodiments, the indicator is included in a dependency parameter set, a sequence parameter set, a picture parameter set, an adaption parameter set, a video parameter set, a sequence header, a picture header, a slice header, a tile group header, a tile, or a group of coding tree units.

In some embodiments, which of the first residual coding technique or the second residual coding technique is applied or a manner in which the residual coding technique is applied is determined based on a characteristic of the block. In some embodiments, the characteristic comprises a dimension of the block, a virtual pipelining data unit, a picture type, or a low delay check flag of the block. In some embodiments, the characteristic comprises a color component or a color f2ormat of the block. In some embodiments, the characteristic comprises whether the block is coded using a transform skip residual coding technique or a quantized residual domain block differential pulse-code modulation coding technique.

In some embodiments, a max number of context coded bins per unit is based on a color component of the block. In some embodiments, a max number of context coded bins per unit is based on a slice, a tile, a tile group, or a picture type of the block. In some embodiments, a max number of context coded bins per unit is different for different profiles, levels, tiers associated with the video. In some embodiments, a max number of context coded bins per unit is signaled in the bitstream representation in a dependency parameter set, a sequence parameter set, a picture parameter set, an adaption parameter set, a video parameter set, a sequence header, a picture header, a slice header, a tile group header, a tile, or a group of coding tree units. In some embodiments, the block is a coding tree unit, a coding unit, a transform unit, or a coding group, and a max number of context coded bins per block is based on a dimension of the block. In some embodiments, the block is a coding tree unit, a coding unit, a transform unit, or a coding group, and a max number of context coded bins per block is based on a resolution of a picture in which the block is positioned.

In some embodiments, performing the conversion includes generating the bitstream representation based on the block of the video. In some embodiments, performing the conversion includes generating the block of the video from the bitstream representation.

Some embodiments of the disclosed embodiments include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed embodiments include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically EPROM (EEPROM), and flash memory devices; magnetic disks, e.g., internal hard disks or removable disks; magneto optical disks; and compact disc read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
determining, during a conversion between a current transform block of a video and a bitstream of the video, whether to switch from a first residual coding mode to a second residual coding mode based on a number of context coded bins of the current transform block used in the first residual coding mode, wherein the current transform block is coded using a transform skip mode, wherein, in the transform skip mode, a transform process is skipped for a prediction residual, and wherein coefficients of the current transform block are coded in the bitstream in multiple passes using the first residual coding mode or the second residual coding mode; and
performing the conversion based on the determining,
wherein the first residual coding mode is used for bins that are decoded with a context coding mode in which a bin is processed based on at least one context,
wherein the second residual coding mode is used for bins that are decoded with a bypass coding mode in which a bin is processed without using any context, and
wherein there is no switch from the first residual coding mode to the second residual coding mode when the number of context coded bins of the current transform block used in the first residual coding mode is less than or equal to a threshold.

2. The method of claim 1, wherein the first residual coding mode is used for first m passes of the multiple passes, m being equal to 5.

3. The method of claim 2, wherein a switch to the second residual coding mode occurs in an $(m+n)^{th}$ pass of the multiple passes when the number of context coded bins of the current transform block used in the first residual coding mode is greater than a threshold, n being a positive integer.

4. The method of claim 3, wherein the threshold depends on a width and a height of the current transform block.

5. The method of claim 1, wherein the conversion comprises processing multiple syntax elements of the current transform block, and wherein the multiple syntax elements include at least one sign flag indicating a sign of a transform coefficient level for a scanning position.

6. The method of claim 5, wherein the first residual coding mode is used to process a part of the at least one sign flag when the number of context coded bins of the current transform block used in the first residual coding mode is less than or equal to a threshold, and wherein the second residual coding mode is used to process another part of the at least one sign flag when the number of context coded bins of the current transform block used in the first residual coding mode is greater than the threshold.

7. The method of claim 1, wherein the first residual coding mode or the second residual coding mode comprises processing multiple syntax elements of the current transform block, wherein the multiple syntax elements comprise at least one of a parity flag indicating a parity of a transform coefficient level for a scanning position, a sign flag indicating a sign of the transform coefficient level for the scanning position, a significant flag indicating whether a transform coefficient for the scanning position is zero or not, or an absolute-level flag indicating whether an absolute value of the transform coefficient for the scanning position is greater than a threshold.

8. The method of claim 7, wherein the multiple syntax elements comprise at least one syntax element coded with a Golomb-Rice code.

9. The method of claim 1, wherein a coding unit including the current transform block is coded using a differential coding mode, and wherein, in the differential coding mode, differences between quantized residuals derived with an intra prediction mode of the coding unit and predictions of the quantized residuals are included in the bitstream.

10. The method of claim 1, wherein the conversion includes encoding the current transform block into the bitstream.

11. The method of claim 1, wherein the conversion includes decoding the current transform block from the bitstream.

12. An apparatus for processing video data comprising a processor and a non-transitory memory with instructions thereon, wherein the instructions upon execution by the processor, cause the processor to:
determine, during a conversion between a current transform block of a video and a bitstream of the video, whether to switch from a first residual coding mode to a second residual coding mode based on a number of context coded bins of the current transform block used in the first residual coding mode, wherein the current transform block is coded using a transform skip mode, wherein, in the transform skip mode, a transform process is skipped for a prediction residual, and wherein coefficients of the current transform block are coded in the bitstream in multiple passes using the first residual coding mode or the second residual coding mode; and perform the conversion based on the determining, wherein the first residual coding mode is used for bins that are decoded with a context coding mode in which a bin is processed based on at least one context, wherein the second residual coding mode is used for bins that are decoded with a bypass coding mode in which a bin is processed without using any context, and wherein there is no switch from the first residual coding mode to the second residual coding mode when the number of context coded bins of the current transform block used in the first residual coding mode is less than or equal to a threshold.

13. The apparatus of claim 12, wherein the first residual coding mode is used for first m passes of the multiple passes, m being equal to 5, wherein a switch to the second residual coding mode occurs in an $(m+n)^{th}$ pass of the multiple passes when the number of context coded bins of the current transform block used in the first residual coding mode is greater than a threshold, n being a positive integer, and wherein the threshold depends on a width and a height of the current transform block.

14. A non-transitory computer-readable storage medium storing instructions that cause a processor to:

determine, during a conversion between a current transform block of a video and a bitstream of the video, whether to switch from a first residual coding mode to a second residual coding mode based on a number of context coded bins of the current transform block used in the first residual coding mode, wherein the current transform block is coded using a transform skip mode, wherein, in the transform skip mode, a transform process is skipped for a prediction residual, and wherein coefficients of the current transform block are coded in the bitstream in multiple passes using the first residual coding mode or the second residual coding mode; and perform the conversion based on the determining, wherein the first residual coding mode is used for bins that are decoded with a context coding mode in which a bin is processed based on at least one context, wherein the second residual coding mode is used for bins that are decoded with a bypass coding mode in which a bin is processed without using any context, and wherein there is no switch from the first residual coding mode to the second residual coding mode when the number of context coded bins of the current transform block used in the first residual coding mode is less than or equal to a threshold.

15. The non-transitory computer-readable storage medium of claim 14, wherein the first residual coding mode is used for first m passes of the multiple passes, m being equal to 5, wherein a switch to the second residual coding mode occurs in an $(m+n)^{th}$ pass of the multiple passes when the number of context coded bins of the current transform block used in the first residual coding mode is greater than a threshold, n being a positive integer, and wherein the threshold depends on a width and a height of the current transform block.

16. The non-transitory computer-readable storage medium of claim 14, wherein the conversion comprises processing multiple syntax elements of the current transform block, wherein the multiple syntax elements include at least one sign flag indicating a sign of a transform coefficient level for a scanning position, wherein the first residual coding mode is used to process a part of the at least one sign flag when the number of context coded bins of the current transform block used in the first residual coding mode is less than or equal to a threshold, and wherein the second residual coding mode is used to process another part of the at least one sign flag when the number of context coded bins of the current transform block used in the first residual coding mode is greater than the threshold.

17. The non-transitory computer-readable storage medium of claim 14, wherein the first residual coding mode or the second residual coding mode comprises processing multiple syntax elements of the current transform block, wherein the multiple syntax elements comprise at least one of a parity flag indicating a parity of a transform coefficient level for a scanning position, a sign flag indicating a sign of the transform coefficient level for the scanning position, a significant flag indicating whether a transform coefficient for the scanning position is zero or not, or an absolute-level flag indicating whether an absolute value of the transform coefficient for the scanning position is greater than a threshold, and wherein the multiple syntax elements comprise at least one syntax element coded with a Golomb-Rice code.

18. A non-transitory computer-readable recording medium storing a bitstream of a video which is generated by a method performed by a video processing apparatus, wherein the method comprises:

determining, whether to switch from a first residual coding mode to a second residual coding mode based on a number of context coded bins of a current transform block of the video used in the first residual coding mode, wherein the current transform block is coded using a transform skip mode, wherein, in the transform skip mode, a transform process is skipped for a prediction residual, and wherein coefficients of the current transform block are coded in the bitstream in multiple passes using the first residual coding mode or the second residual coding mode; and generating the bitstream based on the determining, wherein the first residual coding mode is used for bins that are decoded with a context coding mode in which a bin is processed based on at least one context, and wherein the second residual coding mode is used for bins that are decoded with a bypass coding mode in which a bin is processed without using any context, and wherein there is no switch from the first residual coding mode to the second residual coding mode when the number of context coded bins of the current transform block used in the first residual coding mode is less than or equal to a threshold.

19. The non-transitory computer-readable recording medium of claim 18, wherein the first residual coding mode is used for first m passes of the multiple passes, m being equal to 5, wherein a switch to the second residual coding mode occurs in an $(m+n)^{th}$ pass of the multiple passes when the number of context coded bins of the current transform block used in the first residual coding mode is greater than a threshold, n being a positive integer, and wherein the threshold depends on a width and a height of the current transform block.

* * * * *